(12) United States Patent
Curtsinger et al.

(10) Patent No.: US 6,988,348 B2
(45) Date of Patent: Jan. 24, 2006

(54) METHOD FOR PACKAGING SAW BLADES

(75) Inventors: John Curtsinger, Shelbyville, KY (US); Daniel G. Findle, White Hall, MD (US); Leonard R. Baublitz, Manchester, MD (US)

(73) Assignee: Black & Decker Inc., Newark, DE (US)

( * ) Notice: Subject to any disclaimer, the term of this patent is extended or adjusted under 35 U.S.C. 154(b) by 86 days.

(21) Appl. No.: 11/050,259

(22) Filed: Feb. 3, 2005

(65) Prior Publication Data

US 2005/0126125 A1 Jun. 16, 2005

Related U.S. Application Data

(60) Division of application No. 10/122,156, filed on Apr. 12, 2002, which is a continuation-in-part of application No. 09/998,477, filed on Nov. 30, 2001, now Pat. No. 6,874,635.

(51) Int. Cl.
B65B 35/50 (2006.01)
B65B 53/02 (2006.01)
B65B 61/14 (2006.01)
B65B 61/20 (2006.01)

(52) U.S. Cl. ............... 53/397; 53/415; 53/442; 53/447; 53/456; 53/409; 53/413

(58) Field of Classification Search ............ 53/413, 53/415, 442, 409, 447, 456, 397; 206/303, 206/349, 493, 497
See application file for complete search history.

(56) References Cited

U.S. PATENT DOCUMENTS

| | | | |
|---|---|---|---|
| 102,923 A | 5/1870 | Disston | |
| 716,785 A | 12/1902 | Taylor | |
| 1,640,022 A | 8/1927 | Angler | |
| 2,010,082 A | 8/1935 | Hill | |
| D99,549 S | 5/1936 | Klein | |
| 2,458,971 A | * 1/1949 | Wilson et al. | 53/409 |
| 2,459,460 A | 1/1949 | Segal | |
| 2,598,192 A | 5/1952 | Poust | |
| 2,601,426 A | 6/1952 | Baumann | |
| 2,750,719 A | * 6/1956 | Wandelt | 53/427 |
| 2,878,628 A | 3/1959 | Curry | |
| 2,918,165 A | 12/1959 | Paulick, Jr. | |
| 2,950,004 A | 8/1960 | Acomb | |
| 2,954,118 A | 9/1960 | Anderson | |
| 3,005,542 A | 10/1961 | Harrison | |
| 3,018,883 A | 1/1962 | Wohlforth | |
| 3,096,877 A | 7/1963 | Skarsten | |
| 3,259,231 A | 7/1966 | Romanowski et al. | |
| 3,274,302 A | 9/1966 | Anderson et al. | |
| 3,326,250 A | 6/1967 | Kephart | |
| 3,358,902 A | 12/1967 | Emmert et al. | |
| 3,412,524 A | 11/1968 | Nestell et al. | |
| 3,640,049 A | * 2/1972 | Fritz et al. | 53/442 |
| 3,710,531 A | * 1/1973 | Bielawski | 53/409 |
| 3,906,702 A | * 9/1975 | Yano | 53/442 |
| 3,942,298 A | * 3/1976 | Matzinger et al. | 53/409 |
| 3,967,727 A | 7/1976 | Jakesch | |
| 4,071,141 A | 1/1978 | Gray | |
| 4,098,577 A | 7/1978 | Halpern | |

(Continued)

Primary Examiner—John Sipos
(74) Attorney, Agent, or Firm—Harness, Dickey & Pierce, P.L.C.

(57) ABSTRACT

A protective cover for use on one or more saw blades. The cover is formed from a heat shrinking material that is shrunk on the saw blade(s) to provide a thin close fitting cover that protects teeth on the saw blade(s). A tag can be attached to the cover and/or saw blade(s). The tag has a security device that is spaced from the saw blade(s) to prevent interference. The tag can be used to hang the saw blade(s) from a display device. An insert card having indicia thereon can be positioned on the saw blade(s) to convey information.

21 Claims, 18 Drawing Sheets

U.S. PATENT DOCUMENTS

| | | |
|---|---|---|
| 4,174,037 A | 11/1979 | Chow |
| 4,282,973 A | 8/1981 | Binkowski |
| 4,369,575 A | 1/1983 | Schurman |
| 4,566,923 A | 1/1986 | Mueller |
| 4,588,082 A * | 5/1986 | Ridings ............... 206/303 |
| 4,696,394 A | 9/1987 | Estkowski et al. |
| 4,832,301 A | 5/1989 | Hiramoto et al. |
| 4,863,128 A | 9/1989 | Good |
| 4,865,352 A | 9/1989 | Gollon |
| 4,876,843 A | 10/1989 | O'Brien et al. |
| 4,890,809 A | 1/1990 | Good |
| 4,902,547 A | 2/1990 | Good |
| D311,620 S | 10/1990 | Rose |
| 5,020,761 A | 6/1991 | Good et al. |
| 5,033,253 A | 7/1991 | Havens et al. |
| 5,048,676 A | 9/1991 | Borgis et al. |
| 5,114,012 A | 5/1992 | Mushinski et al. |
| 5,145,283 A | 9/1992 | Gowen |
| 5,154,289 A | 10/1992 | Van Erden |
| 5,203,137 A * | 4/1993 | Tsukada et al. ............ 53/409 |
| 5,211,322 A | 5/1993 | Nealy |
| 5,328,137 A | 7/1994 | Miller et al. |
| 5,419,933 A | 5/1995 | Tsukada et al. |
| 5,456,057 A | 10/1995 | Bannon et al. |
| 5,511,883 A | 4/1996 | Clark et al. |
| 5,542,634 A | 8/1996 | Pomerantz |
| 5,583,489 A | 12/1996 | Loemker et al. |
| 5,728,440 A | 3/1998 | Good |
| 5,819,931 A * | 10/1998 | Boucher et al. ............ 206/349 |
| 5,884,425 A | 3/1999 | Baldwin |
| 6,029,815 A | 2/2000 | Ali |
| 6,199,309 B1 | 3/2001 | Markarian |
| 6,254,953 B1 | 7/2001 | Elston |
| 6,260,698 B1 | 7/2001 | Delost et al. |
| 6,267,239 B1 | 7/2001 | Maki |
| D449,522 S | 10/2001 | Brown |
| 6,382,676 B1 | 5/2002 | Cochran et al. |
| 6,395,373 B2 | 5/2002 | Conti et al. |
| RE37,764 E | 6/2002 | Good |
| 6,484,875 B1 | 11/2002 | Brainerd et al. |
| 6,729,468 B1 * | 5/2004 | Dobmeier ................. 206/303 |
| 2001/0005534 A1 | 6/2001 | Pomerantz |
| 2001/0049000 A1 | 12/2001 | Conti et al. |
| 2002/0045026 A1 | 4/2002 | Conti et al. |
| 2002/0056514 A1 | 5/2002 | Grosskopf et al. |

* cited by examiner

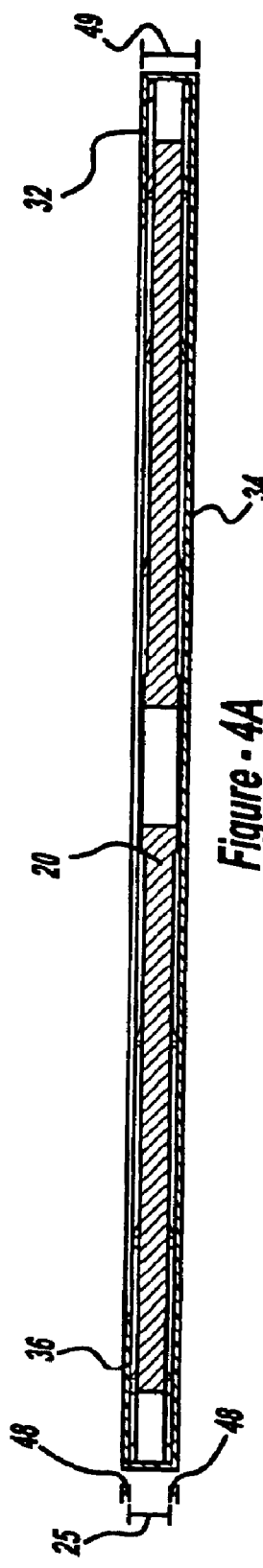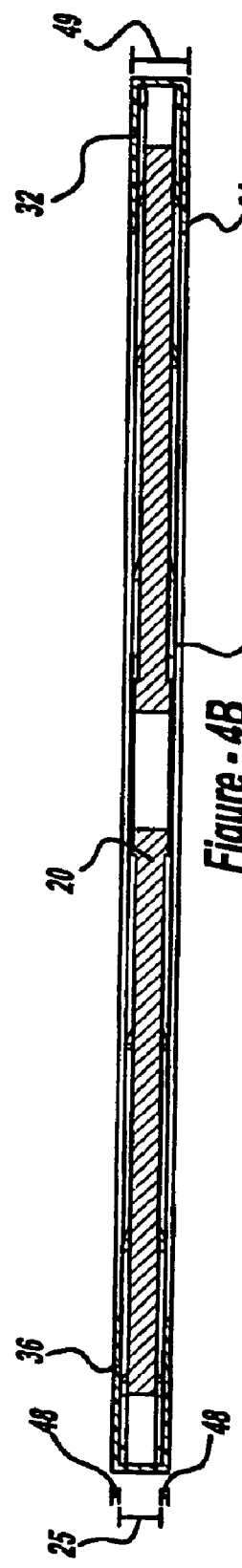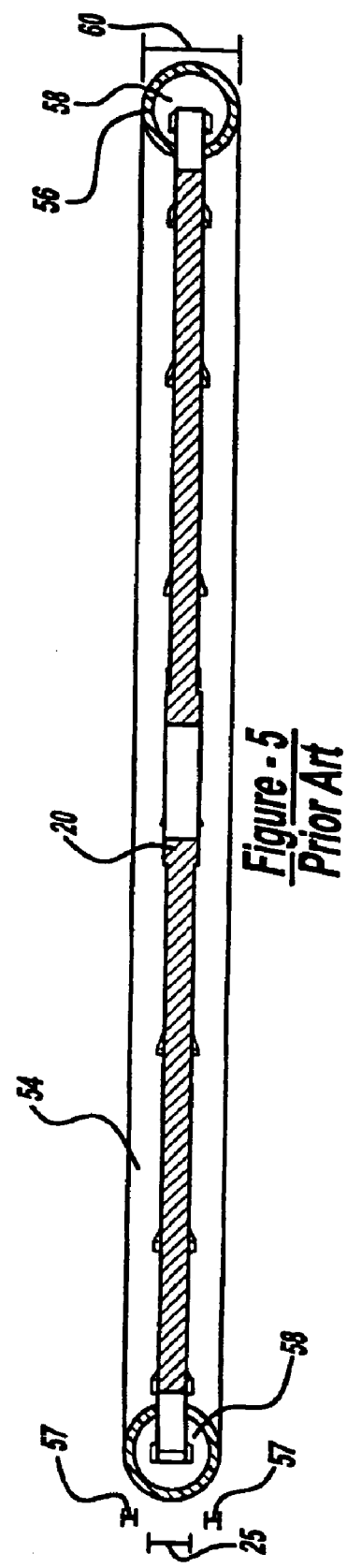
Figure - 4A
Figure - 4B
Figure - 5
Prior Art

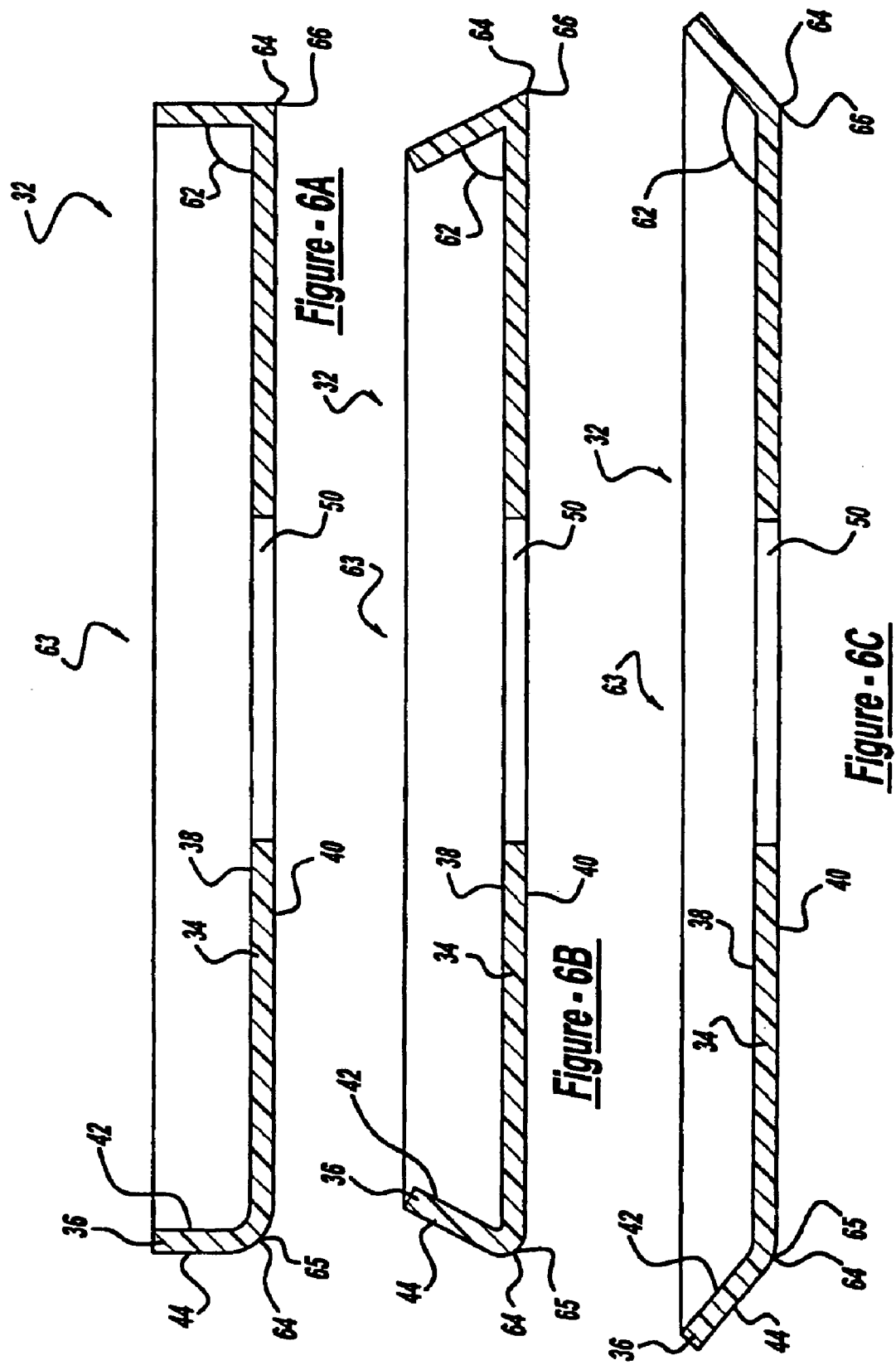

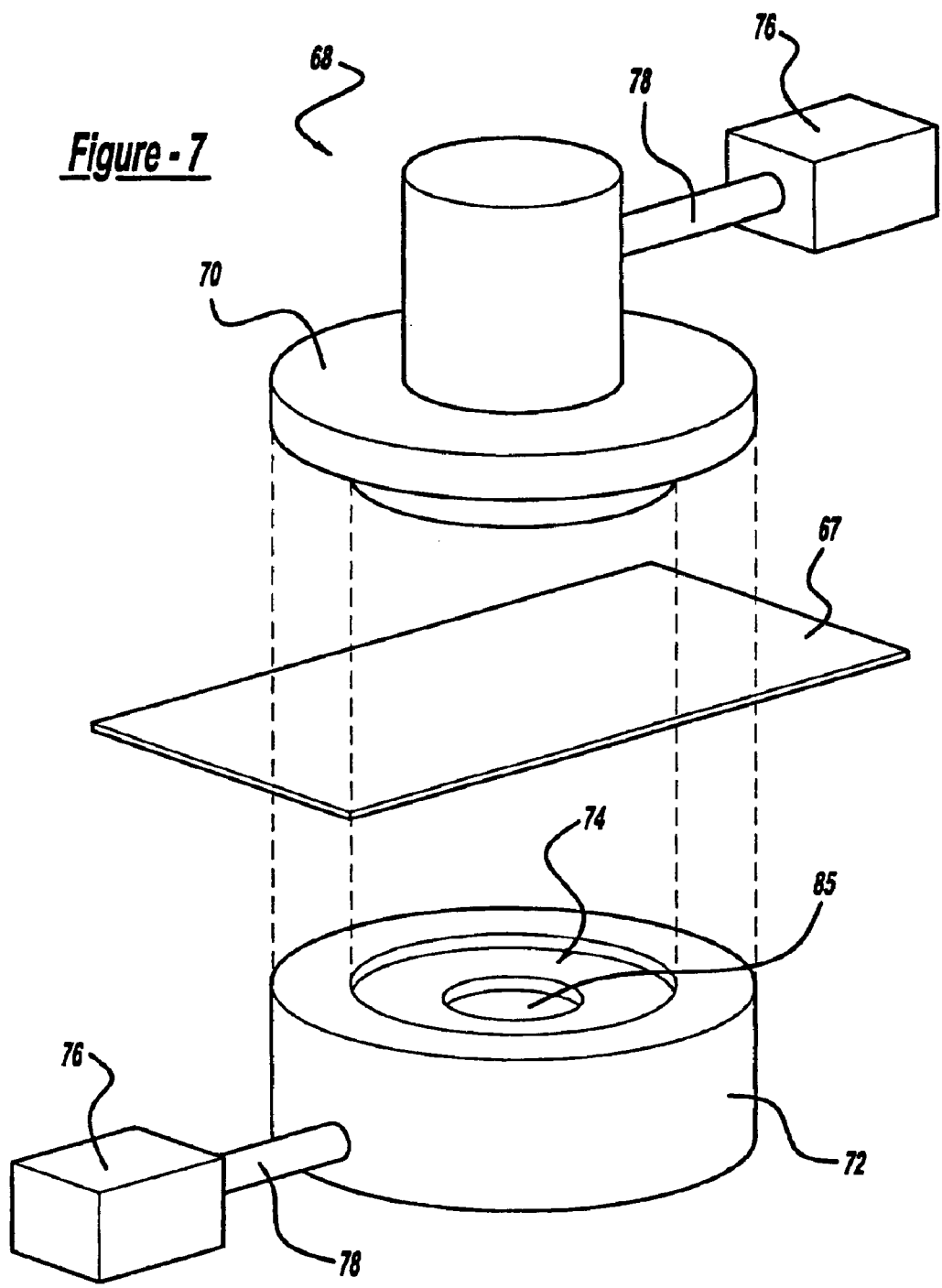

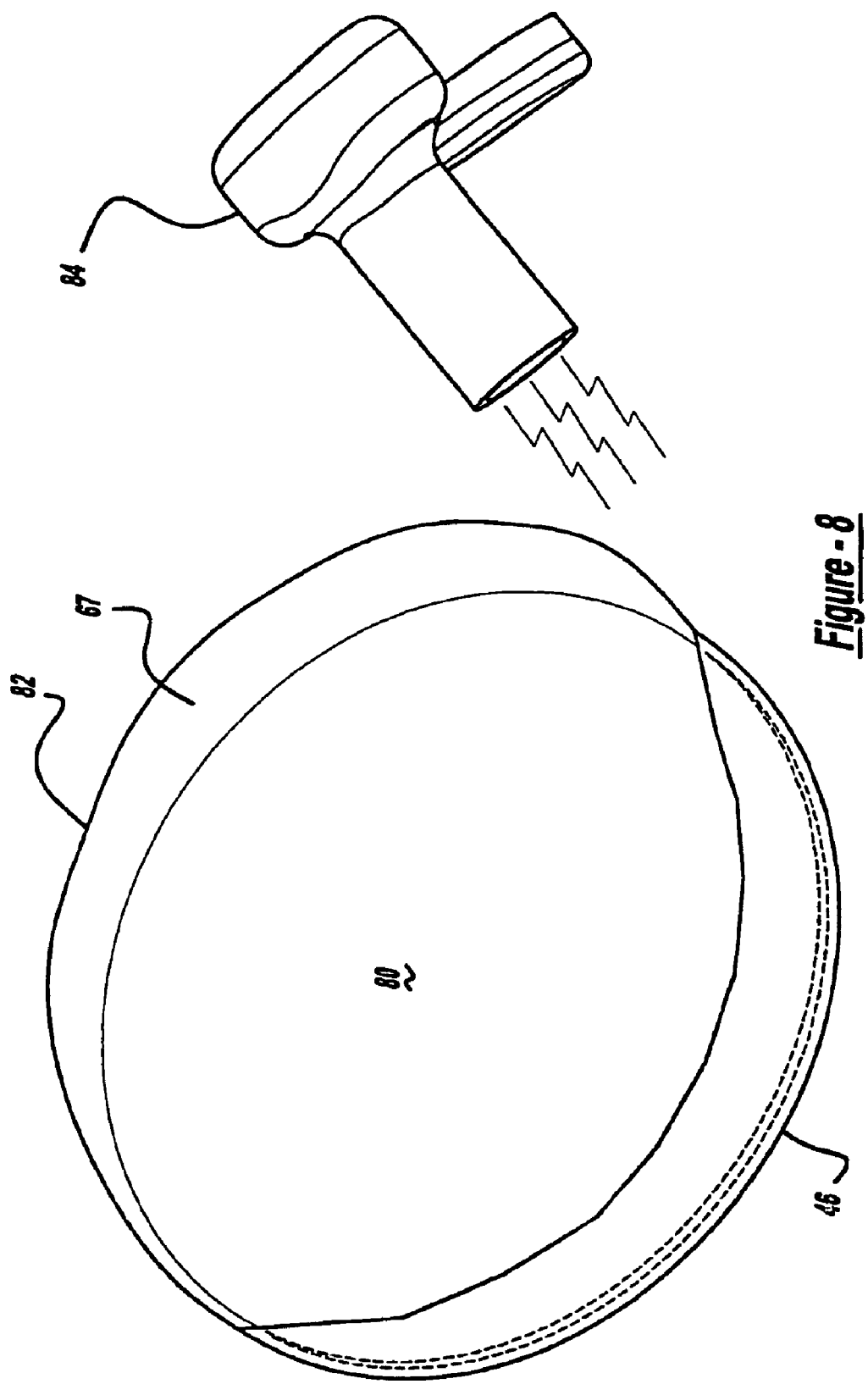

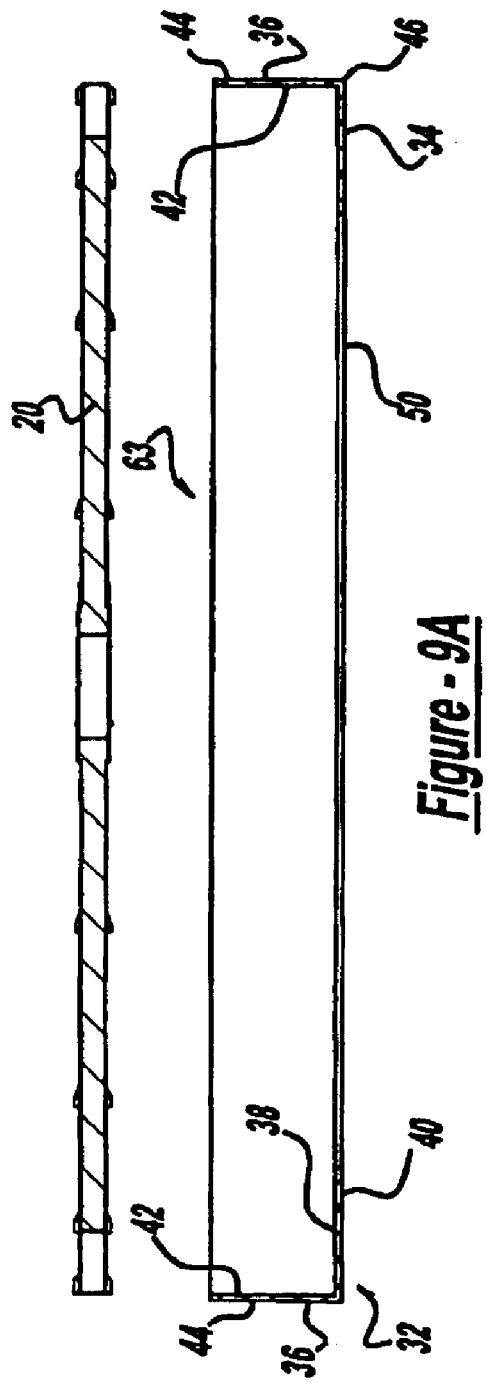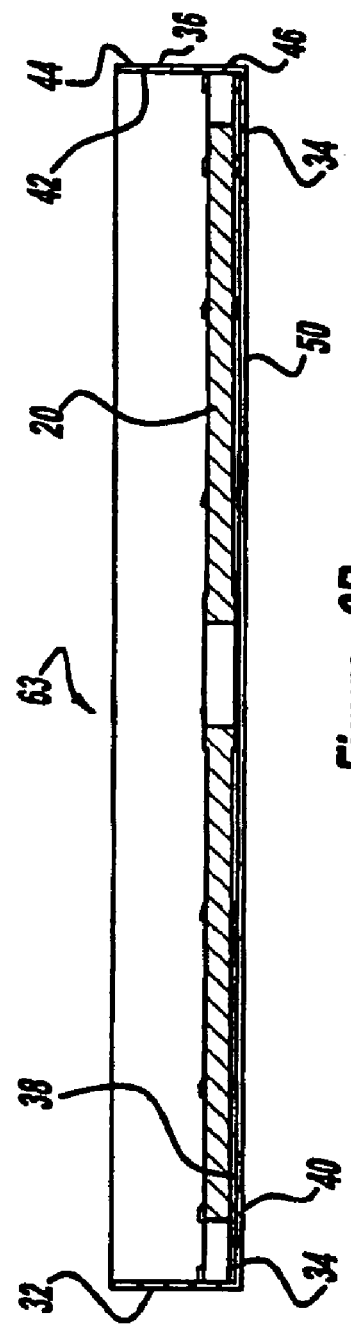

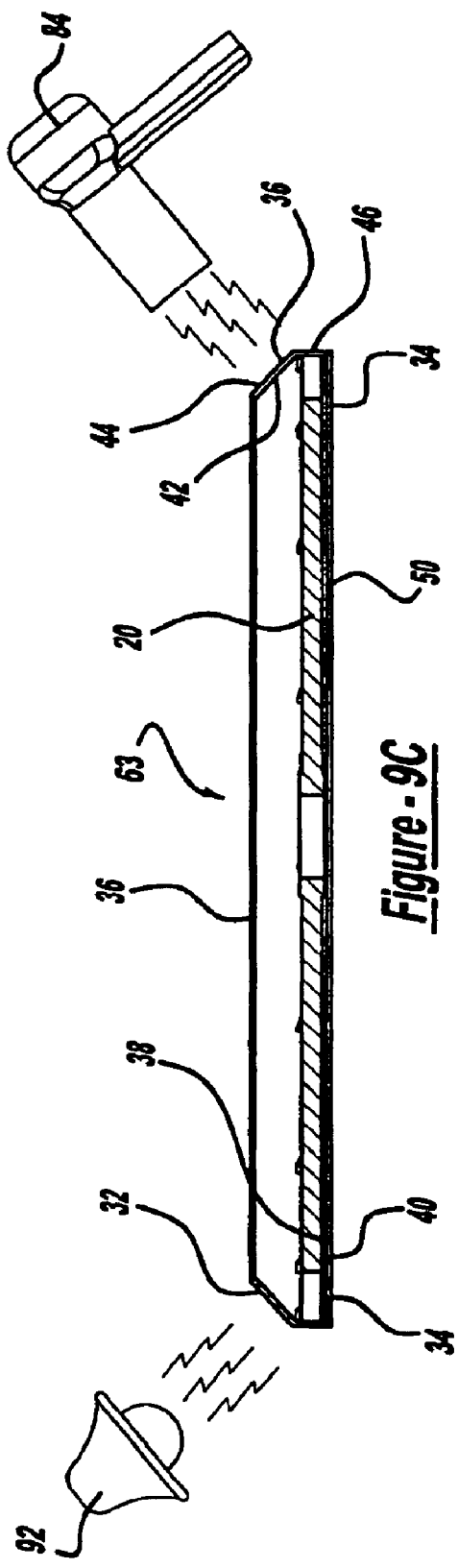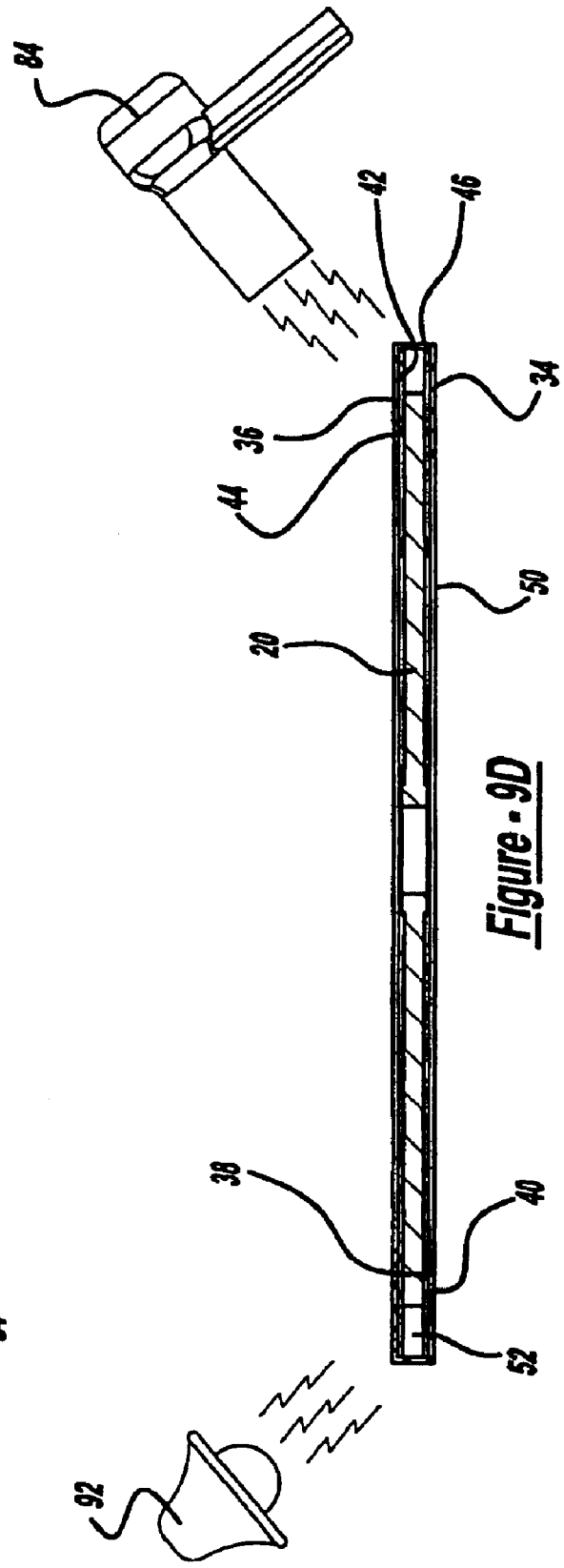

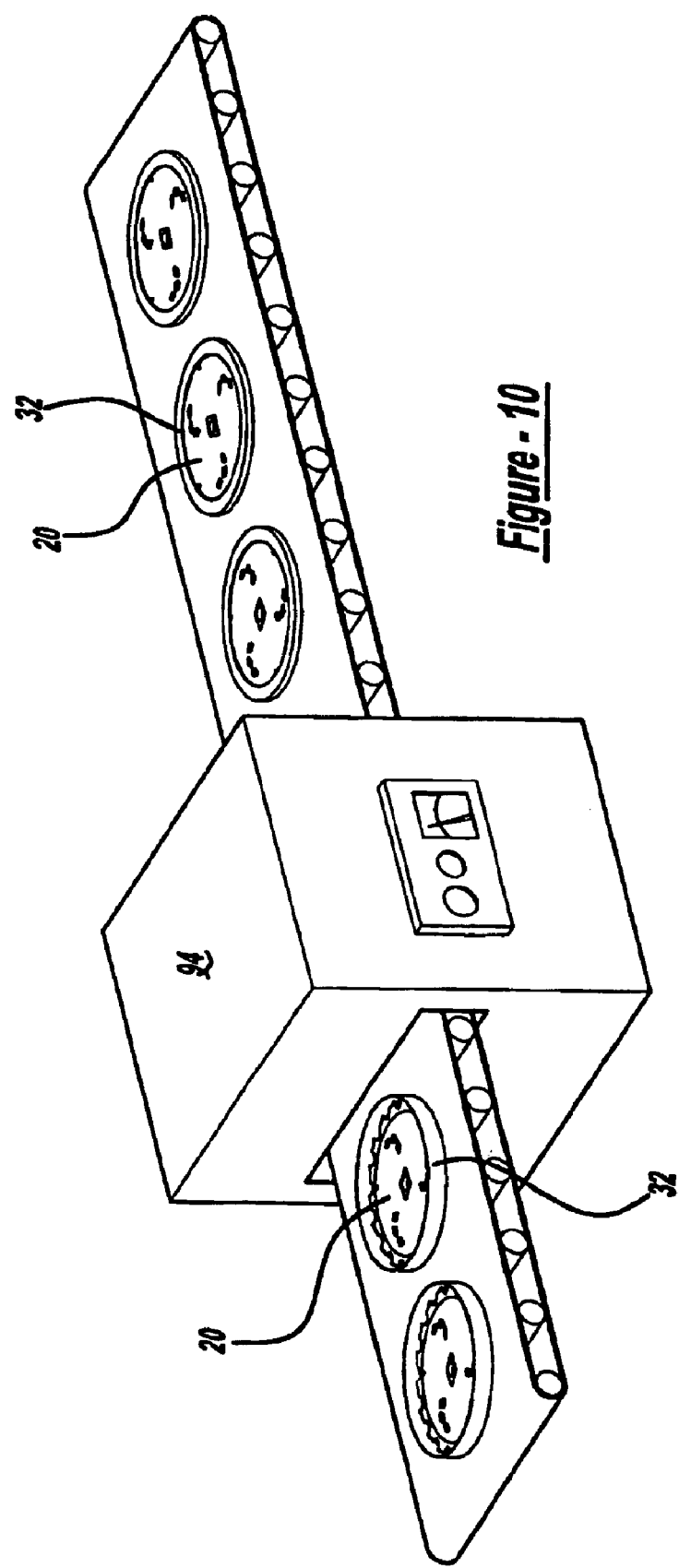

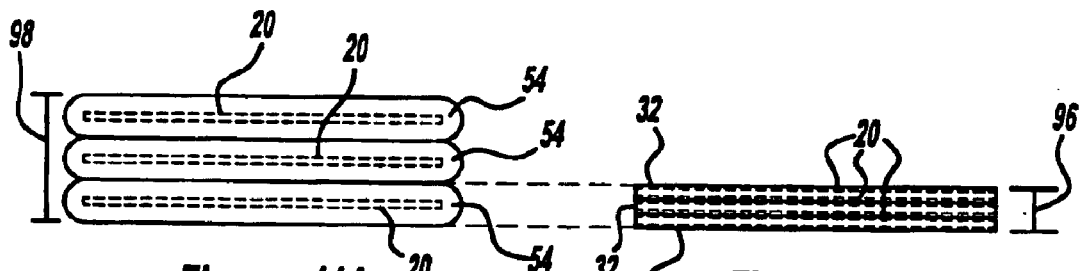
Figure - 11A
Prior Art
Figure - 11B
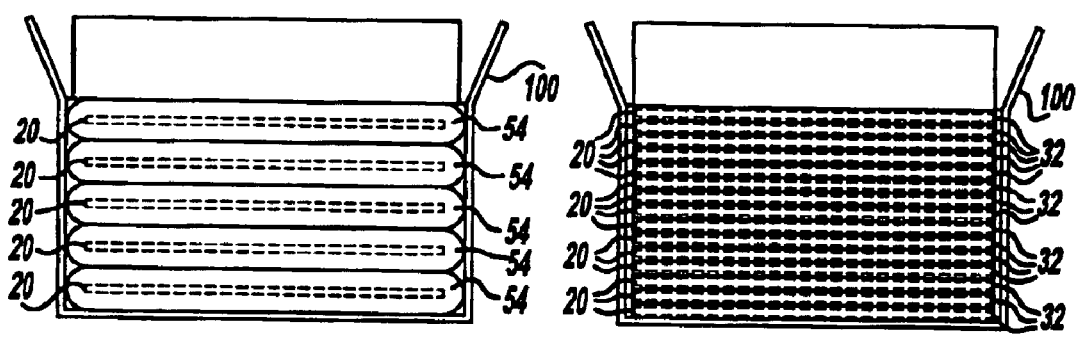
Figure - 12A
Prior Art
Figure - 12B

METHOD FOR PACKAGING SAW BLADES

CROSS-REFERENCE TO RELATED APPLICATIONS

This application is a divisional of U.S. patent application Ser. No. 10/122,156, filed Apr. 12, 2002, which is a continuation-in-part of application Ser. No. 09/998,477, filed on Nov. 30, 2001, now U.S. Pat. No. 6,874,635. The disclosures of the above applications are incorporated herein by reference.

FIELD OF THE INVENTION

The present invention relates to saw blades and, more particularly, to saw blade(s) having a protective cover that protects the teeth on the saw blade(s) and protects a person handling the saw blade(s), and to tags for security and display purposes that can be used on saw blade(s) with or without the protective cover.

BACKGROUND OF THE INVENTION

Saw blades come in a variety of shapes and forms. For example, saw blades can be of the circular type that have teeth that extend around the periphery of the circular saw blade. Saw blades can also be of the reciprocating type that are linear and have teeth along one peripheral edge of the linear blade. The teeth on the saw blades are sharp and can injure a person handling the blades if care is not exercised. Additionally, the sharp teeth on the saw blades can damage other objects or goods that inadvertently come in contact with the teeth. Furthermore, the teeth can have special tips, such as carbide tips, that can be damaged if the blade is mishandled or dropped. Therefore, saw blades are typically packaged with a protective cover that encloses the teeth and prevents accidental injury or damage to a person, other goods, or the teeth of a saw blade.

A typical prior art cover used on saw blades is a flexible plastic tubing that has a single cut through the tubing wall along the length of the tubing, such as disclosed in commonly assigned U.S. Pat. No. 5,456,057. The tubing is wrapped around the periphery of the saw blade with the teeth extending into an interior of the tubing through the cut along the length of the tubing. The tubing thereby encloses the teeth of the saw blade and provides a protective cover for the teeth of the saw blade. Because the tubing has a circular cross section while the saw blade is relatively flat, the tubing is not close fitting to the saw blade and is substantially thicker than the saw blade. The tubing thereby provides a protective cover that significantly adds to the overall thickness of the protected saw blade.

Other prior art covers include a cardboard cutout with a folded pocket. The cutout provides protection for the saw blade and, provided with hole(s), can be used for retail peg hook display. The cutout may be dimensioned to protect a plurality of saw blades within the cutout. However, the cutout must be thick enough to provide the strength required to support the saw blade(s). Additionally, the overall size of a cutout is larger than that of the saw blade such that a saw blade(s) within the cutout occupies more space than a saw blade(s) without the cutout. The cutout thereby provides a protective cover that adds to a thickness and overall size of a protected saw blade(s).

The increased overall thickness and/or size of the saw blade(s) having a protective cover increases the space that each saw blade(s) with a protective cover occupies. For example, the increased overall thickness substantially increases the height of a stack of saw blades having a protective cover over the height of a stack of the same number of saw blades without a protective cover. The increased thickness and/or overall size has a number of drawbacks. For example, the increased overall thickness and/or size requires a larger display area at a store to display a given number saw blades over those without a protective cover. Additionally, the saw blades are typically shipped in boxes of a fixed dimension. Because saw blades with protective covers have an overall thickness substantially larger than saw blades without protective covers, less saw blades with protective covers can be fit within the fixed dimension box than the number of saw blades that can fit within the fixed dimension box that do not have protective covers. The increased overall size of saw blades having protective covers also requires the fixed dimension box to have inner dimensions that are larger than a diameter of the saw blades in order to accommodate the protective covers. The decreased number of saw blades with a protective cover that can fit in the fixed dimension box and the needed larger inner dimensions of the fixed dimension box increases the box waste per saw blade packaged in the box and the cost of the box. For example, if the fixed dimension box can normally hold twenty saw blades that do not have a protective cover but can only hold five saw blades that have a protective cover, the box waste per blade is increased four fold and results in more packaging waste per saw blade shipped to a buyer. Furthermore, the larger inner dimensions and the decreased capacity of the fixed dimension box increases the packaging and shipping cost for a provider of saw blades with a protective cover.

Therefore, what is needed is a protective cover that protects the teeth of a saw blade or stack of saw blades but results in overall dimensions that are less than that achieved with the use of prior art protective covers. By reducing one or more of the overall dimensions of the saw blades with a protective cover, the stack height for a given number of saw blades can be reduced, more saw blades having a protective cover can be placed in a fixed dimension box, the inner dimensions of the fixed dimension box can be reduced, the amount of box waste per saw blade can be reduced, the cost of packaging the saw blades can be reduced, and/or the amount of space required to display a given number of blades with protective cover(s) in a store can be reduced.

A difficulty with providing a more compact protective cover and display means for saw blade(s) is reduced sensitivity and/or failure of security devices that may be packaged with the saw blade(s). Security devices, such as electronic article surveillance tags, can experience a reduced capacity and/or fail to provide the required security function if attached directly to or in close proximity to a metal object, such as a saw blade. Many retailers require that these security devices be installed in retail packaging. Therefore, it is desirable to provide a security device that works properly with retail packaged saw blade(s) but does not add excessive bulk or size to the packaged saw blade(s).

Yet another difficulty in providing a compact protective cover for saw blade(s) is the need to provide indicia, such as consumer or retail related information, on the packaging. The reduced size of a compact protective cover reduces the area of printable packaging and decreases the amount of indicia that can be effectively displayed and conveyed on the packaged saw blade(s). Therefore, it is desirable to provide a compact protective cover while retaining the ability to convey desired information on the packaged saw blade(s).

SUMMARY OF THE INVENTION

The present invention is directed to the use of a heat shrinking material to provide a protective cover for the teeth of a saw blade or stack of saw blades that results in a saw blade or stack of saw blades having a protective cover that has an overall thickness that is less than that of a stack of the same number of saw blades having a prior art protective cover. The protective cover also helps prevent injury to a person handling the saw blade(s). Another aspect of the present invention provides a tag that can be used to attach a security device to saw blade(s) and/or for display purposes. The present invention also discloses an insert card that can be used for display purposes.

In one aspect of the present invention, a method of protecting teeth on saw blades in a stack of saw blades is disclosed. The method includes the steps of: (1) positioning a stack of saw blades adjacent a heat shrinking material so that at least one of a periphery of said stack or a first side of said stack is in contact with said heat shrinking material; and (2) heating said heat shrinking material so that said heat shrinking material shrinks and covers teeth on said saw blades of said stack and forms a protective cover.

In another aspect of the present invention, a method of packaging one or more saw blades is disclosed. The method includes the steps of: (1) positioning at least one saw blade adjacent a heat shrinking material so that at least one of a periphery of said at least one saw blade or a first side of said at least one saw blade is in contact with said heat shrinking material; (2) heating said heat shrinking material so that said heat shrinking material shrinks and covers teeth of said at least one saw blade thereby forming a protective cover; and (3) attaching a tag to at least one of said protective cover or said at least one saw blade.

The present invention also discloses a method of packaging stacks of saw blades having protective covers. The method includes the steps of: (1) positioning a stack of saw blades adjacent a heat shrinking material so that at least one of a periphery of said stack or a first side of said stack is in contact with said heat shrinking material; (2) heating said heat shrinking material so that said heat shrinking material shrinks and covers teeth on said saw blades of said stack thereby forming a protective cover; and (3) placing said stack with said protective cover in a fixed dimension box along with other stacks having protective covers with an overall thickness of each stack being aligned.

A method of packaging one or more saw blades is disclosed. The method includes the steps of: (1) positioning at least one saw blade adjacent a heat shrinking material so that at least one of a periphery of said at least one saw blade or a first side of said at least one saw blade is in contact with said heat shrinking material; (2) positioning an insert card adjacent said at least one saw blade so that said insert card is in contact with said at least one saw blade and indicia on said insert card faces away from said at least one saw blade; and (3) heating said heat shrinking material so that said heat shrinking material shrinks and covers teeth of said at least one saw blade and a portion of said insert card and forms a protective cover.

In yet another aspect of the present invention, a preformed protective cover for a stack of saw blades is disclosed. The cover has first and second portions that each have opposite inner and outer surfaces. The second portion extends from the first portion at an angle relative to the first portion so that the first and second portions are not co-planar. The first and second portions are configured and adapted to allow a stack of saw blades to be positioned in contact with the inner surface of the first portion. The stack is formed by placing a plurality of saw blades adjacent to one another with a thickness of each saw blade being aligned. The first and second portions are made from a heat shrinking material so that the second portion folds over the stack with the inner surface of the second portion facing the inner surface of the first portion and teeth on the saw blades of the stack positioned between the inner surfaces of the first and second portions when heat is applied to the first and second portions.

In still another aspect of the present invention, a saw blade having a protective cover is disclosed. There is at least one saw blade having opposite first and second sides. The at least one saw blade has a peripheral edge and a plurality of teeth that extend along a portion of the peripheral edge. There is a cover made of a heat shrinking material that shrinks and protects the teeth on the at least one saw blade when heat is applied to the cover. The cover has first and second portions with opposite inner and outer surfaces. The inner surface of the first portion is disposed against the first side of the at least one saw blade. The second portion is folded over the first portion with the inner surface of the second portion facing the inner surface of the first portion and securing the at least one saw blade and the teeth between the first and second portions.

The present invention also discloses a flexible tag that can be attached to one or more saw blades. The tag has a security device and a flexible body. The flexible body has opposite first and second ends and opposite inner and outer surfaces. The security device is disposed on the inner surface. The body has an adhesive portion that allows the tag to be attached to at least one saw blade with the security device spaced from the at least one saw blade so that the at least one saw blade does not interfere with operation of the security device.

An insert card for packaging one or more saw blades is disclosed in the present invention. The insert card has a body with opposite inner and outer surfaces. The outer surface has indicia thereon. The body also has a peripheral edge. The body is configured to be positioned on a saw blade with the inner surface facing the saw blade and a portion of the peripheral edge aligned with a periphery of the saw blade.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a cross sectional view of the saw blade within the protective cover taken along line 4—4 of FIG. 3 showing the protective cover having a solid bottom surface;

FIG. 4B is a cross sectional view of the saw blade within the protective cover taken along line 4—4 of FIG. 3 showing the protective cover having a bottom surface with a central opening;

FIG. 5 is a cross sectional view of the saw blade of FIG. 1 within a prior art protective cover;

FIGS. 6A–C are cross sectional views of various embodiments of the preformed cover of the present invention;

FIG. 7 is a perspective view of a molding machine used to preform the protective cover of the present invention;

FIG. 8 is a perspective view of a heat gun and a blank being used to preform the protective cover of the present invention;

FIGS. 9A–D are cross sectional views of the preformed protective cover of the present invention showing the various steps of positioning the saw blade within the preformed protective cover and applying heat to the preformed protective cover via a heat gun and/or a radiant heat source to cause the preformed protective cover to shrink around the saw blade and form the protective cover of the present invention;

FIG. 10 shows the heating of the preformed protective cover with a saw blade positioned in the cover by passing the preformed protective cover with the saw blade through a heat tunnel to form a saw blade having a protective cover of the present invention;

FIGS. 11A–B illustrates the stack heights of saw blades having a prior art protective cover (FIG. 11A) and having the protective cover of the present invention (FIG. 11B);

FIGS. 12A–B illustrates the number of saw blades having a prior art protective cover (FIG. 12A) and the number of saw blades having the protective cover of the present invention (FIG. 12B) that can fit within a fixed dimension box.

DETAILED DESCRIPTION OF THE PREFERRED EMBODIMENTS

The following description of the preferred embodiment(s) is merely exemplary in nature and is in no way intended to limit the invention, its application, or uses.

Figure 1:
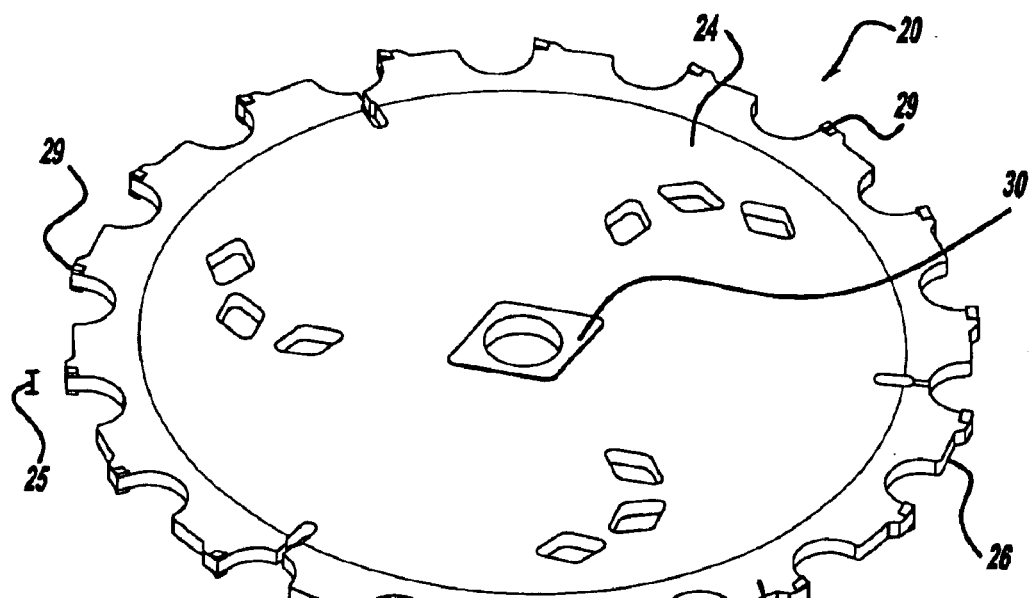
FIG. 1 is a perspective view of a circular type saw blade.
Figure 17:
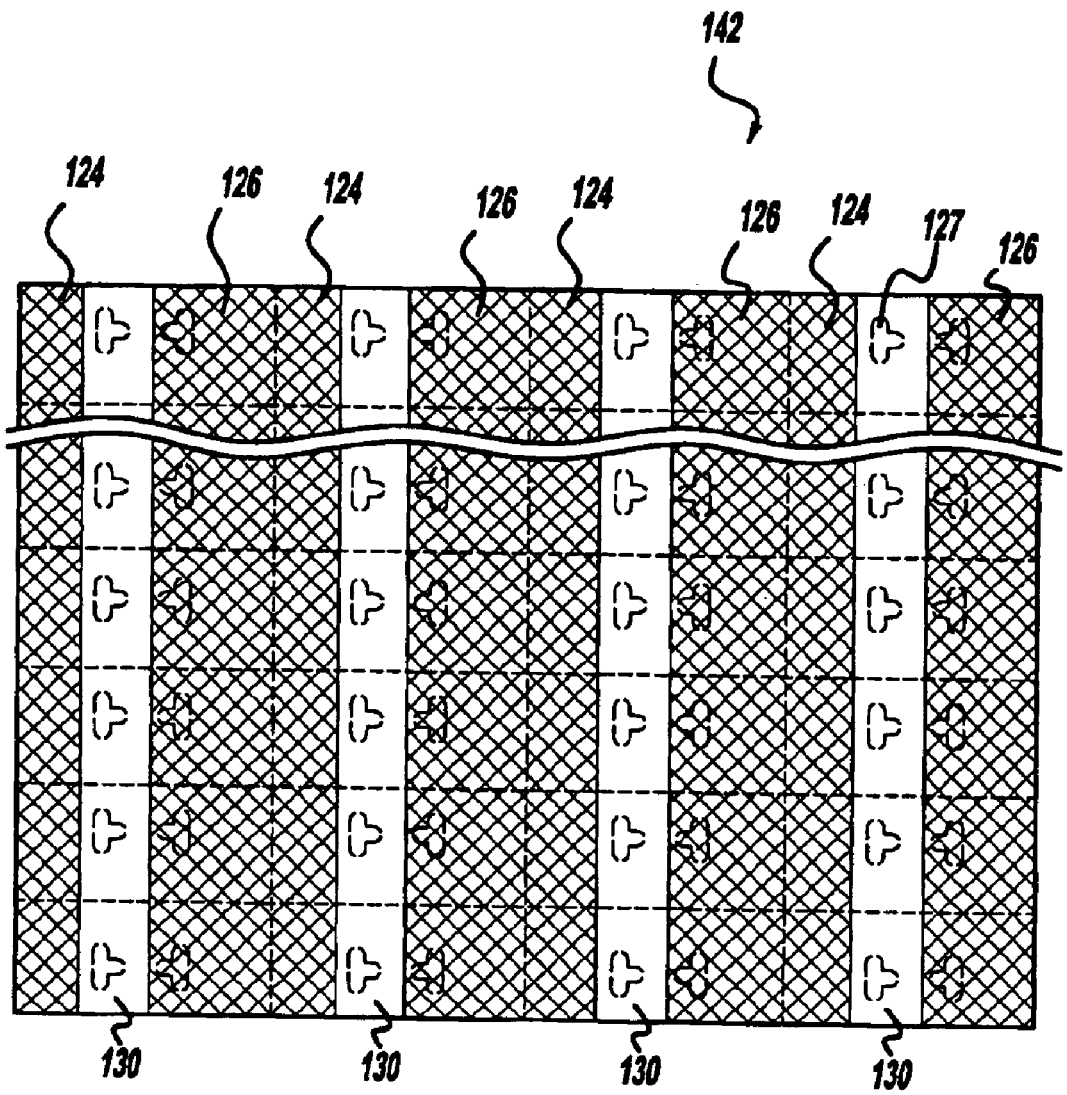
FIG. 17 is plan view of a composite sheet from which tags of FIG. 16A can be die-cut.

Referring to FIG. 1, a saw blade 20 having opposite first and second sides 22, 24 with a thickness 25 therebetween and a peripheral edge 26 is shown. The saw blade 20 has a plurality of recesses 27 and teeth 28 positioned along peripheral edge 26. The number of recesses 27 and teeth 28 will vary depending upon the application for which the saw blade 20 is intended to be used. The teeth 28 may have tips 29 that are made of a special material to accommodate the application in which the saw blade 20 is intended to be used. For example, the teeth 28 can have carbide tips, diamond tips, etc. that will vary for the application in which the saw blade 20 is to be used. When the saw blade 20 has tips 29, the thickness 25 of the saw blade 20 includes the thickness of the tips 29. The saw blade 20 has a central opening 30 that allows the saw blade 20 to be mounted on a power tool (not shown). The saw blade 20, as shown in FIG. 17, may have indicia 31, such as product and safety information, on the first and/or second sides 22, 24. The saw blade 20 shown in FIG. 1 is a circular saw blade. Circular saw blades can come in a variety of diameters, as is known in the art. For example, the saw blade can come in a 7¼" diameter, a 12" diameter, etc. The saw blade 20 can also come in a variety of shapes other than circular. For example, the saw blade 20 can be a straight or linear saw blade (not shown) that has teeth that extend along one peripheral edge of the linear saw blade. While the saw blade 20 will be shown and discussed as being a circular type saw blade 20, it should be understood that the invention can also be used on linear type saw blades, as will be apparent to those skilled in the art, and still be within the scope of the invention as defined by the claims.

Figure 2:
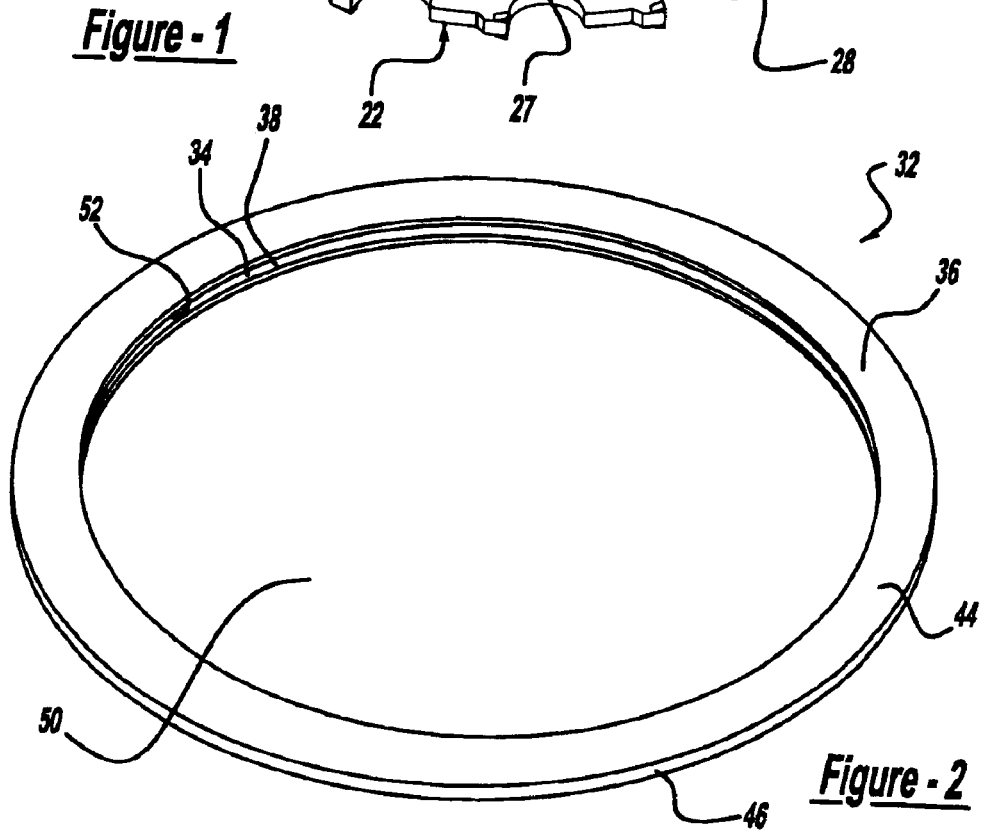
FIG. 2 is a perspective view of a protective cover of the present invention for the saw blade of FIG. 1.
Figure 14:
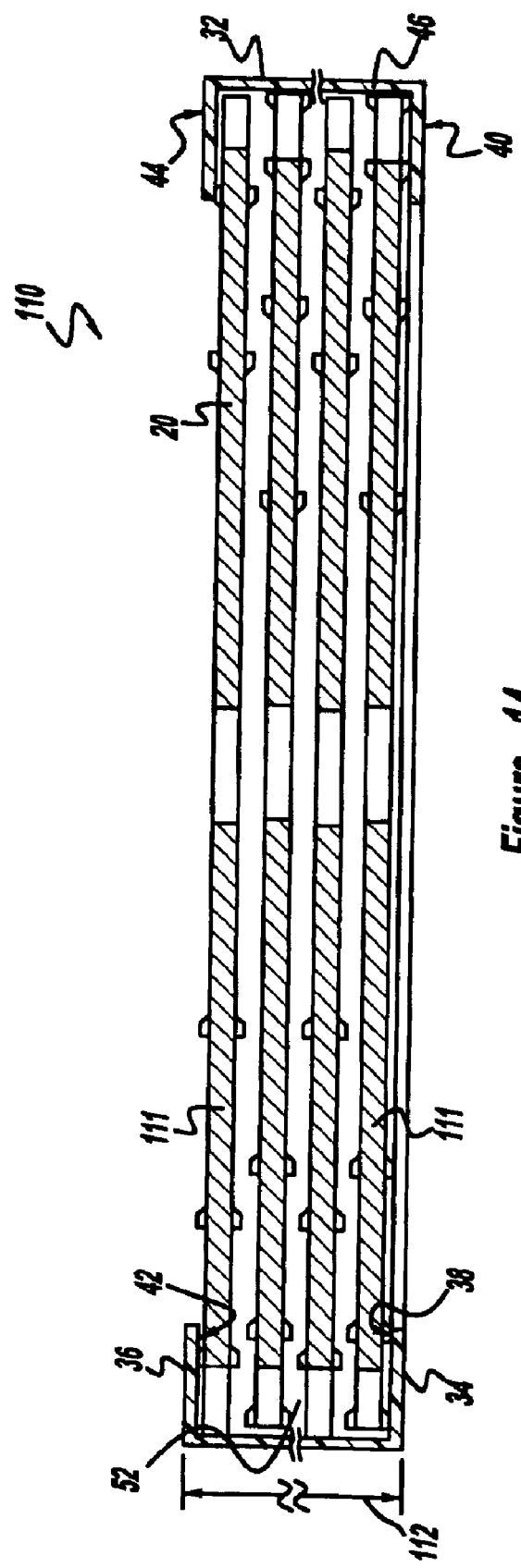
FIG. 14 is an exploded cross sectional view of the stack of saw blades of FIG. 13 within a protective cover similar to the protective cover of FIG. 2.

Referring to FIG. 2, a protective cover 32 which provides a protective enclosure for the teeth 28 of the saw blade 20 is shown with the saw blade 20 removed for illustration purposes. The cover 32 also reduces the potential of the teeth 28 injuring a person handling the saw blade 20. The cover 32 is shown in FIG. 2 in its preferred embodiment sans the circular saw blade 20. The cover 32 is made from a heat shrinking material so that the cover 32 can envelop and protect the teeth 28 of a saw blade 20 when heat is applied to the cover 32, as will be explained in more detail below. The cover 32 can, as shown in FIGS. 14 and 17 and as will be discussed in more detail below, envelop and protect the teeth 28 of a stack of saw blades 20. The cover 32 has first and second portions 34, 36. The first portion 34 has opposite inner and outer surfaces 38, 40. Likewise, the second portion 36 has opposite inner and outer surfaces 42, 44. As can be seen in FIG. 2, the first and second portions 34, 36 are joined along a peripheral edge 46 of the cover 32. The peripheral edge 46 defines the outer radial boundary of the cover 32. The peripheral edge 46 also defines the boundary between the first and second portions 34, 36. Preferably, as shown in FIG. 2, the peripheral edge 46 is circular and the cover 32 is also circular to fit on a circular saw blade 20.

As was mentioned above, the cover 32 is made from a heat shrinking material. As is known in the art, a large number of materials exhibit the characteristic of shrinking in response to heat being applied to the material. More particularly, a large variety of plastics exhibit the characteristics of shrinking when having heat applied. Therefore, the cover 32 can be made from a variety of materials. For example, the cover can be made from vinyl, polyethylene, or, preferably, from PVC. The PVC is preferred as the heat shrinking material for the cover 32 because it is light weight, requires a low temperature (approximately 100° F.) to move/shrink, and has an excellent strength to thickness ratio that allows a thin sheet of PVC to withstand contact with the teeth 28, with or without specialized tips 29, on the saw blade 20 without tearing. The heat shrinking material is preferably transparent, however, color can be added to it to provide a distinctive appearance for the saw blades 20 that have the cover 32. The thickness 48 (as shown in FIGS. 4A, 4B) of the first and second portions 34, 36 of the cover 32 will vary depending upon the needs of a particular application in which the cover 32 is utilized, as will be apparent to those skilled in the art. When using PVC as the heat shrinking material, the thickness 48 of the first and second portions 34, 36 of the cover 32 is preferably about 3.5 mils. However, it should be understood that the thickness 48 of the first and second portions 34, 36 of the cover 32 can vary from 3.5 mils and still be within the scope of the invention as defined by the claims. Therefore, as can be seen in FIGS. 4A–B, when the thickness 48 of the first and second portions 34, 36 is approximately 3.5 mils, the cover 32 adds approximately 7.0 mils to an overall thickness 49 of the saw blade 20. That is, the saw blade 20 having the protective cover 32 will have an overall thickness 49 that is generally equal to the thickness 48 of the first portion 34 plus the thickness 25 of the saw blade 20 plus the thickness 48 of the second portion 36.

The first portion 34, as can be seen in FIG. 4A, can be a solid portion that covers the entire first side 22 of the saw blade 20. Alternatively, and preferably, the first portion 34, as can be seen in FIGS. 2 and 4B, can have an opening 50. Preferably, the opening 50 is a central opening that is generally centered around an axial center line (not shown) of the cover 32.

Figure 3:
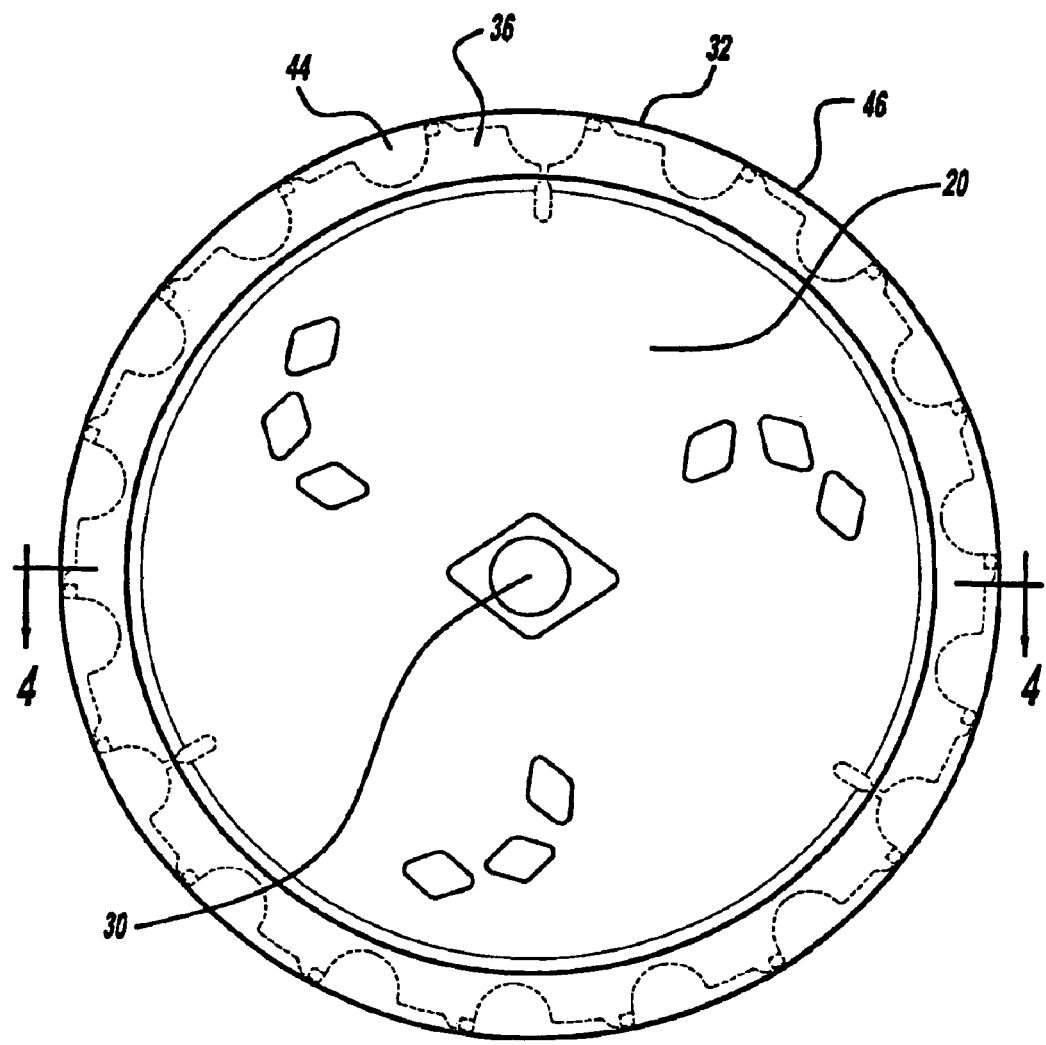
FIG. 3 is a top plan view of the saw blade of FIG. 1 within the protective cover of FIG. 2.

When the first portion 34 of the cover 32 has the central opening 50, the cover 32 has a ring shape, as shown in FIGS. 2, 3, and 4B. The ring shaped cover 32 has an annular channel 52 (best shown in FIG. 2) that is formed by the inner surfaces 38, 42 of the respective first and second portions 34, 36 and the peripheral edge 46 of the cover 32. As can be seen in FIG. 3, when the saw blade 20 is in the cover 32, the teeth 28 along with portions of the first and second sides 22, 24 of the saw blade 20 are within the annular channel 52 and protected by the cover 32. Because the cover 32 is made from a heat shrinking material and is formed by shrinking the cover 32 about the saw blade 20, as will be explained in more detail below, the annular channel 52 is snug against the saw blade 20 and provides a tight fitting cover 32 for the saw blade 20.

In contrast, as shown in FIG. 5, a prior art cover 54 used to protect teeth 28 of a saw blade 20 is not close fitting to the saw blade 20. The prior art cover 54 has a generally circular cross section that extends axially from the first and second sides 22, 24 of the saw blade 20 along with extending radially from the peripheral edge 26 of the saw blade 20. Because the prior art cover 54 is made from a circular tubing having a side wall 56 with a thickness 57, the prior art cover 54 has a significant amount of dead space 58 that surrounds the teeth 28 and the peripheral edge 26 of the saw blade 20 which needlessly increases the overall thickness 60 of the saw blade 20 having a prior art cover 54. That is, as shown in FIG. 5, the overall thickness 60 of the saw blade 20 with the prior art cover 54 includes not only the thickness 25 of the saw blade 20 and two times the thickness 57 of the side walls 56, but also a portion of the dead space 58. Furthermore, the thickness 57 of the walls 56 of the prior art cover 54 are significantly larger than the preferred approximately 3.5 mils thickness 48 of the first and second portions 34, 36 of the cover 32 according to the principles of the present invention. The cover 32 of the present invention thereby provides a saw blade 20 with a protective cover 32 having an overall thickness 49 that is substantially less than the overall thickness 60 of a saw blade 20 having a prior art cover 54. In the preferred embodiment of the present invention, the overall thickness 49 of the saw blade 20 having the cover 32 of the present invention is approximately ⅓ the overall thickness 60 of a saw blade 20 having a prior art cover 54. The present invention thereby provides a saw blade 20 having a cover 32 that is close fitting and significantly reduces an overall thickness of a saw blade having a protective cover.

Optionally, but preferably, the cover 32 is preformed prior to the saw blade 20 being positioned on the heat shrinking material from which the cover 32 is made. The cover 32 is preformed so that the second portion 36 extends from the first portion 34 at an angle 62 relative to the first portion 34 so that the first and second portions 34, 36 of the covers 32 are not co-planar. The cover 32 can be preformed into a variety of configurations. For example, as shown in FIGS. 6A–C, the cover 32 can be preformed so that the angle 62 between the first and second portions 34, 36 of the cover 32 is a right angle 62, as shown in FIG. 6A, an acute angle 62, as shown in FIG. 6B, or an obtuse angle 62, as shown in FIG. 6C. The covers 32 shown in FIGS. 6A–C are cross sections of the cover 32 when it has been preformed.

As can be seen in FIGS. 6A–C, the preformed cover 32 has an opening 63 through which the saw blade 20 can be inserted so that a portion of the first side 22 of the saw blade 20 is in contact with the inner surface 38 of the first portion 34 of the cover 32. The opening 63 needs to be large enough so that the saw blade 20 can be inserted through the opening 63. It should be understood that the opening 63 does not need to be as large as a diameter (not shown) of the saw blade 20 to enable the saw blade 20 to be inserted through the opening 63. For example, in FIG. 6B, the opening 63 might not be as large as the diameter of the saw blade 20, however, the saw blade 20 can be inserted through the opening 63 by inserting the saw blade at an angle relative to the first portion 34 until the peripheral edge 26 of the saw blade 20 contacts the first portion 34 of the cover 32 along the peripheral edge 46 and the remainder of the saw blade 20 can then be inserted through the opening 63 or the opening 63 can be slightly elastically stretched to receive the saw blade 20. To enable the saw blade 20 to be inserted through opening 63 without stretching, the diameter (not shown) of the preformed cover 32 may need to be larger than the diameter of the saw blade 20 so that there is enough room in the opening 63 for the saw blade 20 to be inserted through the opening 63, as will be apparent to those skilled in the art. Therefore, the cover 32, when preformed so that the angle 62 is acute, as shown in FIG. 6B, may need to be slightly larger than the preformed cover 32 that has an angle 62 that is a right angle, as shown in FIG. 6A, or is an obtuse angle, as shown in FIG. 6C. While angle 62 of the preformed cover 32 is shown in FIGS. 6A–C as being either a right angle, an acute angle, or an obtuse angle, it should be understood that the angle 62 can vary along the peripheral edge 46 of the cover 32 from being an acute angle to being a right angle to being an obtuse angle, vice versa and/or other possible variations, as will be apparent to those skilled in the art, and still be within the scope of the invention as defined by the claims.

The peripheral edge 46 that separates the first and second portions 34, 36 of the cover 32 forms a corner 64 on an exterior of the cover 32 when the cover 32 is preformed. The corner 64 of the preformed cover 32 can be a rounded corner indicated as 65 in FIGS. 6A–C or can be comprised of straight segments so that the corner 64 is a sharp or acute corner indicated as 66, in FIGS. 6A–C. It should be understood that the corner 64 can vary from being a rounded corner 65 to being an acute corner 66 as the corner 64 extends around the cover 32 and still be within the scope of the invention as defined by the claims.

The cover 32 can be purchased from a supplier of heat shrinking material already preformed to specific dimensions, or can be preformed from a sheet of heat shrinking material. The preforming of the cover 32 can be done in a variety of ways, as will be apparent to those skilled in the art. For example, as shown in FIG. 7, a sheet 67 of heat shrinking material can be placed in a mold 68 so that the preformed cover 32 can be made. The mold 68 has complementary male and female members 70, 72 that can be pressed together. A sheet 67 of heat shrinking material is positioned between the male and female members 70, 72. The male and female members 70, 72 are then pressed together so that the sheet 67 is pressed into a cavity 74 in the female member 72. The pressing together of the male and female members 70, 72 will make the sheet 67 deform into a predetermined shape as determined by the contours of the cavity 74 of the female member 72 and the configuration of the male member 70, as is known in the art.

The male member 70 and/or the female member 72 can then be heated to a predetermined temperature so that the sheet 67 within the mold 68 shrinks and will maintain the predetermined shape when removed from the mold 68. The heating of the male member 70 and/or the female member 72 of the mold 68 can be done in a variety of ways, as is known to those skilled in the art. For example, the male member 70 and/or the female member 72 can be provided with a flow of hot fluid, such as heated water or steam, from a heat source 76 via fluid supply lines 78. The male and/or female members 70, 72 could also be heated by running an electric current through the male and/or the female members 70, 72 that is supplied by the heat source 76. These methods of heating the components of the mold 68 are known in the art and other methods that will be apparent to those skilled in the art may also be employed without departing from the scope of the invention as defined by the claims.

After the mold 68 has been heated, the male and female members 70, 72 are separated and the preformed cover 32 can be removed from the mold 68. While the mold 68 has been described and is shown as being a press mold, it should be understood that the cover 32 can be preformed by a variety of molding machines, as will be apparent to those skilled in the art. For example, the sheet 67 can be preformed into the cover 32 by use of a vacuum mold and still be within the scope of the invention as defined by the claims.

Alternatively, as shown in FIG. 8, the cover 32 can be preformed by placing a blank 80 on the heat shrinking material sheet 67 and applying heat to the sheet 67. More specifically, the blank 80 is preferably slightly larger than the saw blade 20 and is positioned on the sheet 67 which is preferably circular. The sheet 67 is lifted along a peripheral edge 82 as heat is applied to the sheet 67. The application of heat to the sheet 67 while the sheet 67 is being lifted causes the sheet 67 to shrink and conform to the general shape of the blank 80. The sheet 67 is heated around the entire peripheral edge 82 until the desired preformed shape for the cover 32 is attained, as will be apparent to those skilled in the art. The heating of the sheet 67 can be provided in a variety of ways, as will be apparent to those skilled in the art. For example, as shown in FIG. 8, the heating of the sheet 67 can be done via a heat gun 84. If it is desired to not preform the cover 32, the saw blade 20 can be substituted for the blank 80 and the cover 32 formed by continuing to heat the cover 32 until the desired shaped of the cover 32 is attained by shrinking the cover 32 around the saw blade 20.

The opening 50 in the first portion 34 of the cover 32 can be made in the sheet 67 by the mold 68. That is, the female member 72 can have an opening 85 that is the same dimension as the desired opening 50. The male member 70 will then have a projection or cutting edge (not shown) that will fit within the opening 85 in the female member 72 and cut or press the opening 50 out of the sheet 67 so that the cover 32 has an opening 50 in the first portion 34. Alternatively, the sheet 67 can be precut, by a variety of methods as will be apparent to those skilled in the art, prior to or after being placed in the mold 68 or preformed with the blank 80.

After the cover 32 has been preformed, the saw blade 20 is then inserted into the cover 32 so that the cover 32 can be heat shrunk around the saw blade 20. As can be seen in FIG. 9A, which has a preformed cover 32 of the type shown in FIG. 6A, the saw blade 20 is positioned adjacent the opening 63 in the preformed cover 32. Next, as shown in FIG. 9B, the saw blade 20 is inserted through the opening 63 and into the preformed cover 32 so that at least one of the peripheral edge 26 of the saw blade 20 or a portion of the first side 22 of the saw blade 20 is in contact with the inner surface 38 of the first portion 34 of the cover 32. At this point, the preformed cover 32 with the saw blade 20 is ready to have heat applied to the cover 32 so that the cover 32 shrinks and covers a portion of the second side 24 of the saw blade 20 and protects the teeth 28. The heating of the cover 32 with the saw blade 20 can be performed in a variety of ways, as will be apparent to those skilled in the art. For example, a heated fluid can be forced across the cover 32 so that the cover 32 is heated and shrinks in response to the heat. The heated fluid can be provided in a variety of ways as will be apparent to those skilled in the art. For example, the heated fluid can be provided by a heat gun 84 that supplies a flow of heated air across the cover 32 and causes the cover 32 to shrink in response to the flow of heated air. A radiant heat source can also be used to heat the cover 32. The radiant heat source can be provided in a variety of ways, as will be apparent to those skilled in the art. For example, a heat lamp 92 can be used to provide radiant energy to the cover 32 so that the cover 32 is heated and shrinks. Optionally, the heat lamp 92 can be configured with an element that emits UV waves (light) that cause the cover 32 to shrink in response to the UV waves. Preferably, the cover 32 is uniformly heated so that the cover 32 shrinks uniformly.

As can be seen in FIG. 9C, as the cover 32 responds to being heated, the first and/or second portions 34, 36 shrink and the second portion 36 begins to fold over the first portion 34 and cover a portion of the second side 24 of the saw blade 20. As the cover 32 continues to shrink in response to the heat, the cover 32 will take the form shown in FIG. 9D. As can be seen in FIG. 9D, after the cover 32 has been exposed to heat for a sufficient duration of time, the saw blade 20 will be secured between the inner surfaces 38, 42 of the respective first and second portions 34, 36. The cover 32 thereby encloses the teeth 28 and provides a protective cover 32 to the saw blade 20.

Alternatively, the preformed cover 32 with the saw blade 20 positioned in contact with the first portion 34 can be placed on a conveyor or other moving means and passed through a heat tunnel 94, as shown in FIG. 10. The heat tunnel 94 can apply heat to the cover 32 in a variety of ways, as will be apparent to those skilled in the art. For example, the heat tunnel 94 can apply heat in the previously discussed ways, such as by forcing a heated fluid (preferably air) across the cover 32, applying radiant heat, and/or exposing the cover 32 to UV waves. When the cover 32 is made from PVC, the temperature to which the cover 32 needs to be heated is approximately 100° F. The rate at which the preformed cover 32 with the saw blade 20 passes through the heat tunnel 94 is dependent on, among other things, the temperature of the heat tunnel 94 and the efficiency with which the heating method transmits heat to the cover 32. When the rate at which the cover 32 with the saw blade 20 passes through the heat tunnel 94 is properly set, the cover 32 with the saw blade 20 exits the heat tunnel 94 with the cover 32 closely fitting and securing the saw blade 20. The cover 32 and the saw blade 20 may, optionally, then be cooled by cool air or other means in order to improve the rigidity of the heat shrinking cover for handling purposes.

The above described cover 32 and methods produce a saw blade 20 with a protective cover 32 that is close fitting and has an overall thickness 49 that is substantially less than the overall thickness 60 of saw blade 20 having a prior art cover 54. The lower overall thickness 49 enables a stack of a given number of saw blades 20 having the cover 32 of the present invention to be shorter than a stack of the same given number of saw blades 20 having the prior art cover 54. That is, as can be seen in FIGS. 11A–B, a stack height 96 of three saw blades 20 having the covers 32 of the present invention is substantially shorter than a stack height 98 of three saw blades 20 having the prior art cover 54. The present invention thereby enables a stack of a given number of saw blades 20 having the cover 32 of the present invention to occupy less space or have a lower stack height than a stack of the same given number of saw blades 20 having the prior art cover 54.

The lower stack height 96 enables a box 100 of a fixed dimension to hold more saw blades 20 having the cover 32 of the present invention than saw blades 20 having the prior art cover 54. As can be seen in FIGS. 12A–B, the box 100, as shown in FIG. 12B, can hold a significantly larger number of saw blades 20 having the cover 32 of the present invention than, as can be seen in FIG. 12A, the number of saw blades 20 having the prior art cover 54. As was discussed above and shown in FIGS. 11A–B, the present invention enables the three saw blades 20 having the cover 32 of the present invention to occupy approximately the same space as one saw blade 20 having the prior art cover 54. Therefore, as shown in FIGS. 12A–B, the box 100 is capable of holding fifteen saw blades 20 having the cover 32 of the present invention while only being capable of holding five saw blades 20 having the prior art cover 54. By increasing the number of saw blades 20 with a protective cover 32 that can be positioned in the box 100, the amount of box material utilized can be reduced. That is, only one box 100 is utilized for every fifteen saw blades 20 with the protective cover 32 while one box 100 is utilized for every five saw blades 20 having the prior art cover 54 that are sold. The above invention thereby provides a method of reducing the amount of box material per saw blade 20 with a protective cover that is sold which not only reduces the amount of wastage a purchaser must dispose of but also reduces the cost to the seller of the saw blades 20 by reducing the amount of packaging that is required for each saw blade 20 with a protective cover that is sold. In addition, with the protective cover 32 of the present invention a larger number of saw blades 20 can be displayed in a retail store as compared to the covers of the prior art.

Figure 13:
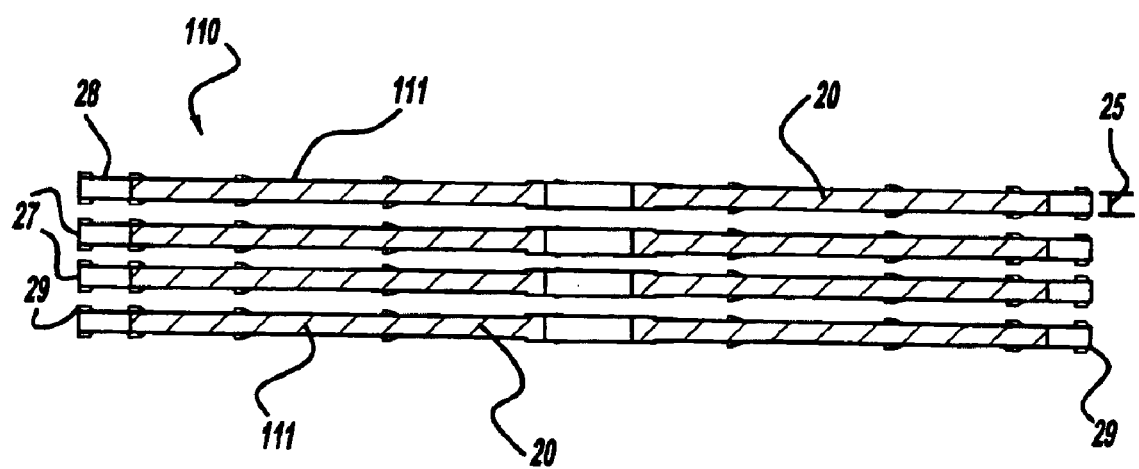
FIG. 13 is an exploded cross sectional view of a stack of saw blades of FIG. 1.

Referring now to FIGS. 13 and 14, an alternate embodiment of the present invention is shown protecting a stack 110 of saw blades 20. The stack 110 comprises a plurality of saw blades 20 positioned adjacent one another so that each saw blade 20 is in contact with at least one other saw blade 20 and the thickness 25 of each saw blade 20 is aligned. It should be understood that, while the drawings of FIGS. 13 and 14 are shown as exploded views for clarity with the saw blades 20 not being in contact with one another, each saw blade 20 in the stack 110 will be in contact with at least one other saw blade 20. The saw blades 20 are arranged in the stack 110 so that the tips 29 on one saw blade 20 are not in contact with the tips 29 on an adjacent saw blade 20. Preferably, the saw blades 20 are arranged so that the tips 29 are not in contact with an adjacent saw blade 20. Even more preferably, the saw blades 20 are arranged so that the tips 29 are aligned with the recesses 27 of an adjacent saw blade 20 so that the tips 29 do not contact an adjacent saw blade 20. In this manner, the stack 110 will have a minimum combined thickness and the resulting thickness of a protected stack 110 of saw blades 20 can be minimized. It should be understood that while four saw blades 20 are depicted in the stack 110 of FIGS. 13, 14 and 18, the stack 110 can be comprised of more or less than four saw blades 20 and still be within the scope of the invention as defined by the claims.

As can be seen in FIG. 14, the stack 110 can be protected by close fitting cover 32. The cover 32 also reduces the potential of the teeth 28 on the saw blades 20 in the stack 110 injuring a person handling the stack 110. Cover 32 envelops the periphery of the stack 110 within the annular channel 52 and protects the teeth 28 and tips 29. The cover 32 is dimensioned so that the first and second portions 34, 36 cover portions of the first or second sides 22, 24 of the two outermost saw blades 111 of stack 110. As seen in FIG. 14, annular channel 52 and peripheral edge 46 of cover 32 are larger for a stack 110 of saw blades 20 than annular channel 52 and peripheral edge 46 of cover 32 for a single saw blade 20 shown in FIG. 2. Additionally, when the cover 32 is made from PVC and is used to protect a stack 110 of saw blades 20, the thickness 48 of the first and second portions 34, 46 and of the peripheral edge 46 may be more than the preferred approximately 3.5 mils. The actual thickness 48 will vary with the quantity of saw blades 20 and the weight of the stack 110. While the thickness 48 may vary, it should be understood that use of the cover 32 of the present invention provides a protected stack 110 of saw blades 20 having an overall thickness 112 that is smaller than that of prior art covers used to cover the same number of saw blades 20.

The cover 32 can be formed around the stack 110 in the same manner as the cover 32 is formed around a single saw blade 20. When the cover 32 is preformed, the saw blades 20 of the stack 110 can be individually inserted through opening 50 and arranged as desired or can be inserted together as a single structure through opening 50. When the saw blades 20 have indicia 31 on the first and/or second sides 22, 24, it is preferred that the saw blades 20 be arranged in the stack 110 so that the indicia 31 on the two outermost saw blades 111 face outward so that the indicia 31 is visible.

Because cover 32 is made from a heat shrinking material and is formed by shrinking the cover 32 about the stack 110, as explained above, the first and second portions 34, 36 and the annular channel 52 are snug against the stack 110 and provide a tight fitting cover 32. In this manner, saw blades 20 within stack 110 are restrained from relative movement, thus protecting teeth 28 and tips 29 of one saw blade 20 from damaging or being damaged by teeth 28 or tips 29 of another saw blade 20 within stack 110. The cover 32 of the present invention can thereby be used to protect a stack 110 of saw blades 20 while having an overall thickness 112 that is substantially less than an overall thickness of the same number of saw blades 20 having prior art covers.

Figure 15:
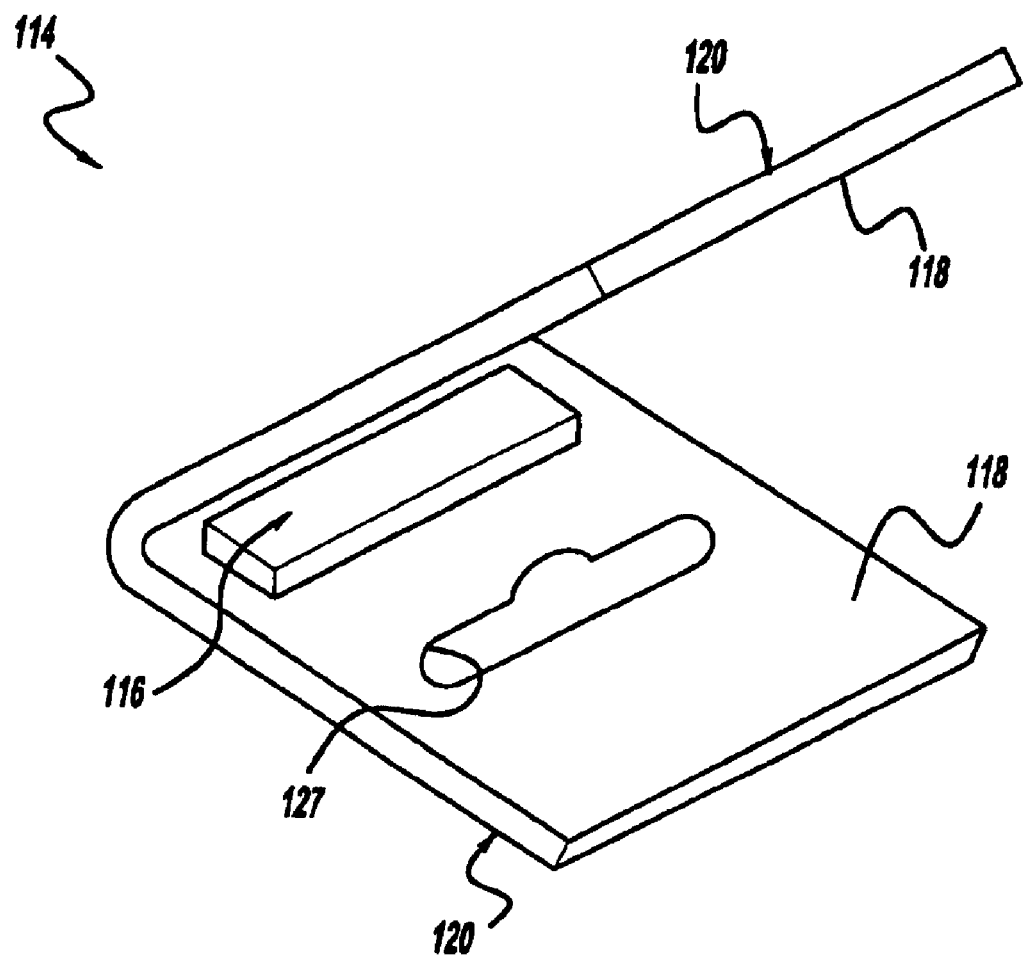
FIG. 15 is a perspective view of a tag of the present invention.
Figure 18:
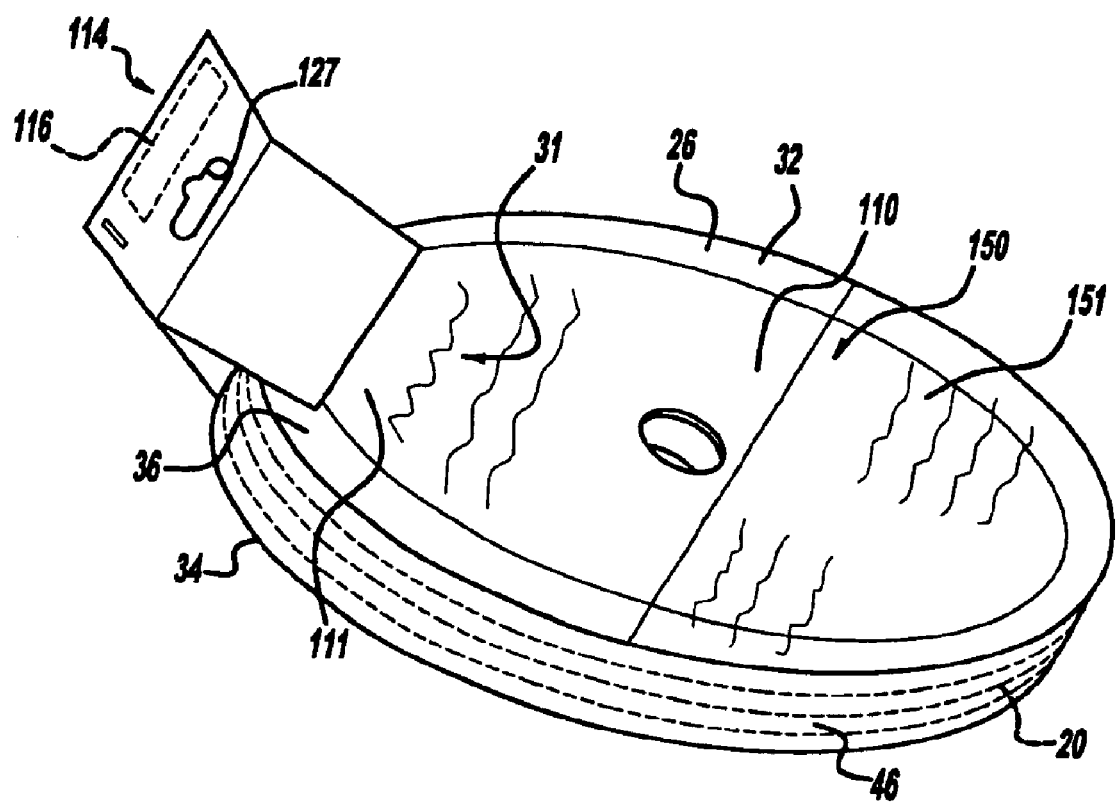
FIG. 18 is a simplified perspective view of a stack of saw blades within a protective cover of the present invention along with a tag and insert card of the present invention.

Referring now to FIG. 15, a tag 114 of the present invention is shown. The tag 114 is designed to be attached to a saw blade 20 or stack 110 of saw blades 20. For brevity, the tag 114 is shown and discussed as being attached to a stack 110 of saw blades 20 and not to an individual saw blade 20. However, it should be understood that the tag 114 can be used on a individual saw blade 20 in the same manner as the tag 114 can be used on stack 110. The tag 114 can be used to attach a security device 116 to stack 110 and/or for facilitating the retail display of stack 110. Preferably, as shown in FIG. 18, the tag 114 is attached to the stack 110 so that when the stack 110 is hung from the tag 114 the indicia 31 on the saw blades 20 is oriented generally horizontal and easily read. The tag 114, as shown in FIG. 15, has opposite inner and outer surfaces 118, 120. The tag 114 is folded at a midpoint 122 so that the inner surface 118 faces itself. However, it should be understood that the tag 114 can be folded at a location other than the midpoint 122 and still be within the scope of the invention as defined by the claims. The security device 116 is attached to the inner surface 118. The tag 114, as shown in FIG. 17, is attached to stack 110 with adhesive portions 124, 126 of the inner surface 118 adhered to the respective first and second portions 34, 36 of the cover 32 and the security device 116 spaced apart from the stack 110. Depending upon the size of the tag 114 and the placement of the tag 114 on the stack 110, the adhesive portions 124, 126 may extend radially inward past the cover 32 and adhere to the two outermost saw blades 111. Preferably, the adhesive portions 124 and any other portions of the tag 114 that may cover portions of the stack 110 are transparent so that any indicia 31 on the saw blades 20 covered by the tag 114 can be seen through the tag 114. Two apertures 127 extend through the tag 114 and are aligned when the tag 114 is attached to the stack 110. The apertures 127 allow the stack 110 to be hung from a display device (not shown), such as a peg hook display. While the tag 114 is shown as being attached to the stack 110 and/or the two outermost saw blades 111 with the two adhesive portions 124, 126, it should be understood that the tag 114 can be attached to the stack 110 and/or two outermost saw blades 111 with a single adhesive portion and still be within the scope of the invention as defined by the claims. Furthermore, the tag 114 can be attached to the stack 110 at a single location and/or to a single outermost saw blade 111 and still be within the scope of the invention as defined by the claims.

Figure 16:
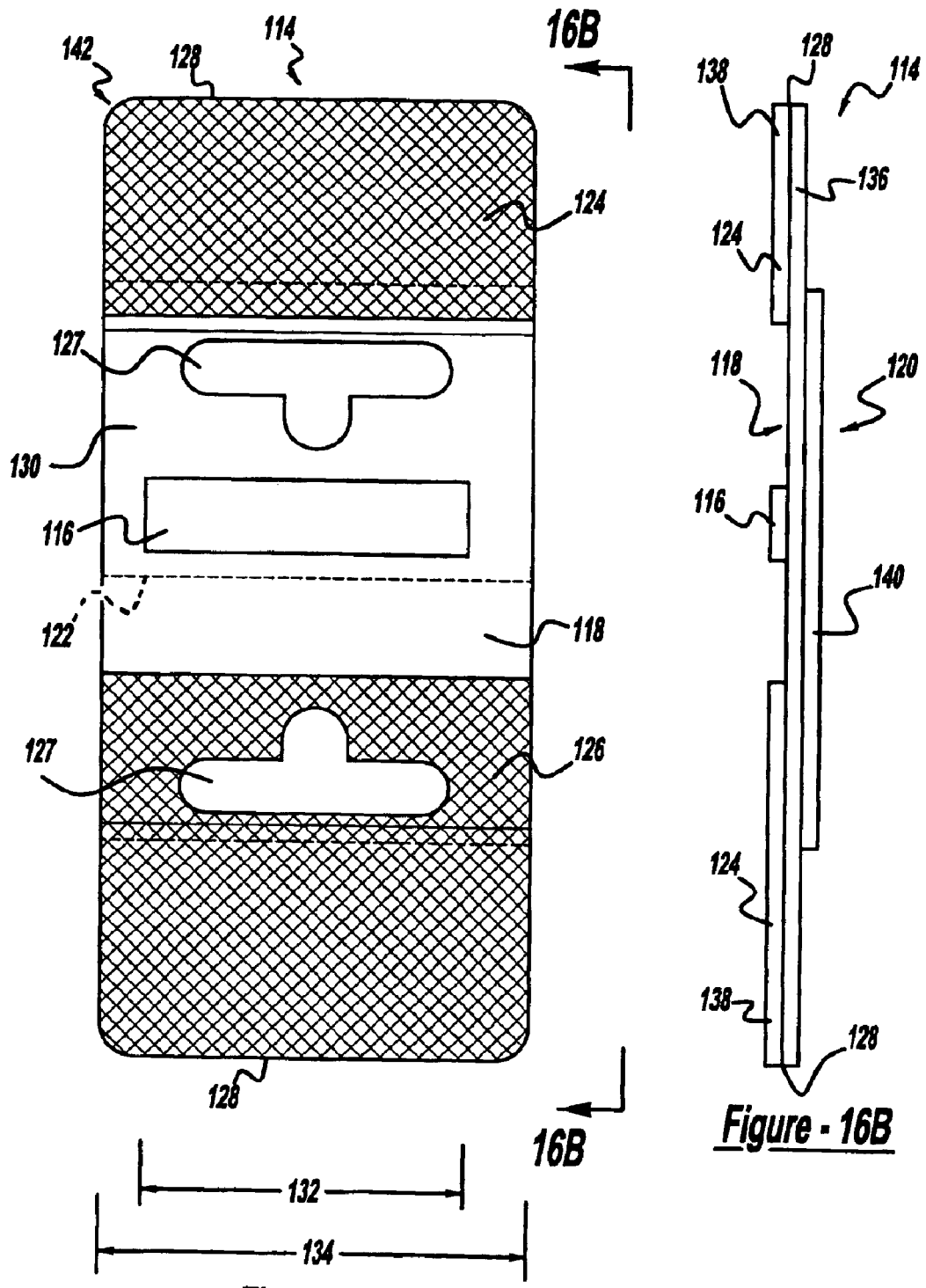
FIG. 16A is a plan view of the tag of FIG. 15.
FIG. 16B is a cross sectional view of the tag of FIG. 16A along line B—B.

Referring now to FIG. 16A, the two adhesive portions 124, 126 are located on the inner surface 120 adjacent opposite ends 128 of the tag 114 with a middle portion 130 extending therebetween. The security device 116 which is attached to the inner surface 120 can be one of a variety of security devices that are known in the industry. For example, the security device 116 can be an electronic article surveillance (EAS) tag. EAS tags are susceptible to poor performance and/or failure when positioned on or near metallic objects. Because the metal content of the saw blades 20 can interfere with the performance of the security device 116, the security device 116 is attached to the middle portion 130 of the inner surface 120 so that the security device 116 is not in contact with the stack 110. Preferably, the security device 116 is attached between the midpoint 122 and one of the apertures 127 to increase the distance between the security device 116 and the stack 110 and further minimize any potential and/or actual interference by the stack 110. To ensure that the potential for interference is minimized, it is preferred that the security device 116 be positioned at least 9 mm away from the stack 110. The security device 116 can be attached to the tag 114 in a variety of ways. For example, the security device 116 can have an adhesive portion that allows the security device 116 to be adhered to the tag 114.

Preferably, the security device 116 is concealed to prevent and/or minimize tampering with the security device 116. To conceal the security device 116, the tag 114 is dimensioned so that a width 132 of the tag 114 is greater than a width 134 of the security device 116 and the security device 116 can reside completely within the tag 114 when folded over and attached to the stack 110. Optionally, one of the adhesive portions 126 can extend into the desired location of the security device 116 and, when folded over, adhere to the opposing inner surface 118 and completely enclose the security device 116 within the tag 114. To aid in concealing the security device 116, the portion of the tag 114 between which the security device 116 is interposed when the tag 114 is folded is preferably opaque so that the security device 116 is not visible through the tag 114. Even more preferably, the opaque portion is the same color as the security device 116 to further aid in concealing the security device 116.

Referring now to FIG. 16B, it can be seen that the tag 114 is comprised of an intermediate sheet 136 with two adhesive sheets 138 on one side of the intermediate sheet 136 and an opaque sheet 140 on an opposite side of the intermediate sheet 136. The adhesive sheets 138 and the opaque sheet 140 are attached to the intermediate sheet 136 so that a single composite sheet 142 is formed. The sheets 136, 138, and 140 can be attached together in a variety of ways. For example, the sheets 136, 138, and 140 can be laminated together to form the composite sheet 142. The composite sheet 142 can be in the form of an individual tag 114 that must each be individually made or, alternatively, as shown in FIG. 17, the composite sheet 142 is substantially larger than an individual tag 114 and a plurality of tags 114 are formed from the composite sheet 142. The plurality of tags 114 can be formed by die cutting the tags 114 from the larger composite sheet 142. The adhesive sheets 138 have a paper backing (not shown) that covers the adhesive on the adhesive sheets 138 and extends beyond the adhesive sheets 138 so that the paper backing can be easily removed to expose the underlying adhesive.

The tag 114 is made from resilient flexible materials so that the tag 114 can be bent for packing and shipping, as will be discussed in more detail below, while returning to a useful form when removed from the shipping container. Therefore, the composite sheet 142 is made from materials that are resilient and flexible. The intermediate sheet 136 is preferably a polyester film, such as Mylar® which is available from E. I. DuPont de Nemours, Wilmington, Del. The intermediate sheet 136 preferably has a thickness of about 0.005". The adhesive sheets 138 are preferably high-temperature adhesive sheets with a thickness of about 0.006". The adhesive sheets 138 are preferably high-temperature sheets because during transit the saw blades 20 maybe exposed to high temperature environments for extended periods of time. Because the adhesive on the adhesive sheets 138 may be in contact with the saw blade 20 in addition to the cover 32, the adhesive is compatible with the material out of which the saw blades 20 are made. The opaque sheet 140 is preferably a vinyl sheet having a thickness of about 0.006".

Figure 19:
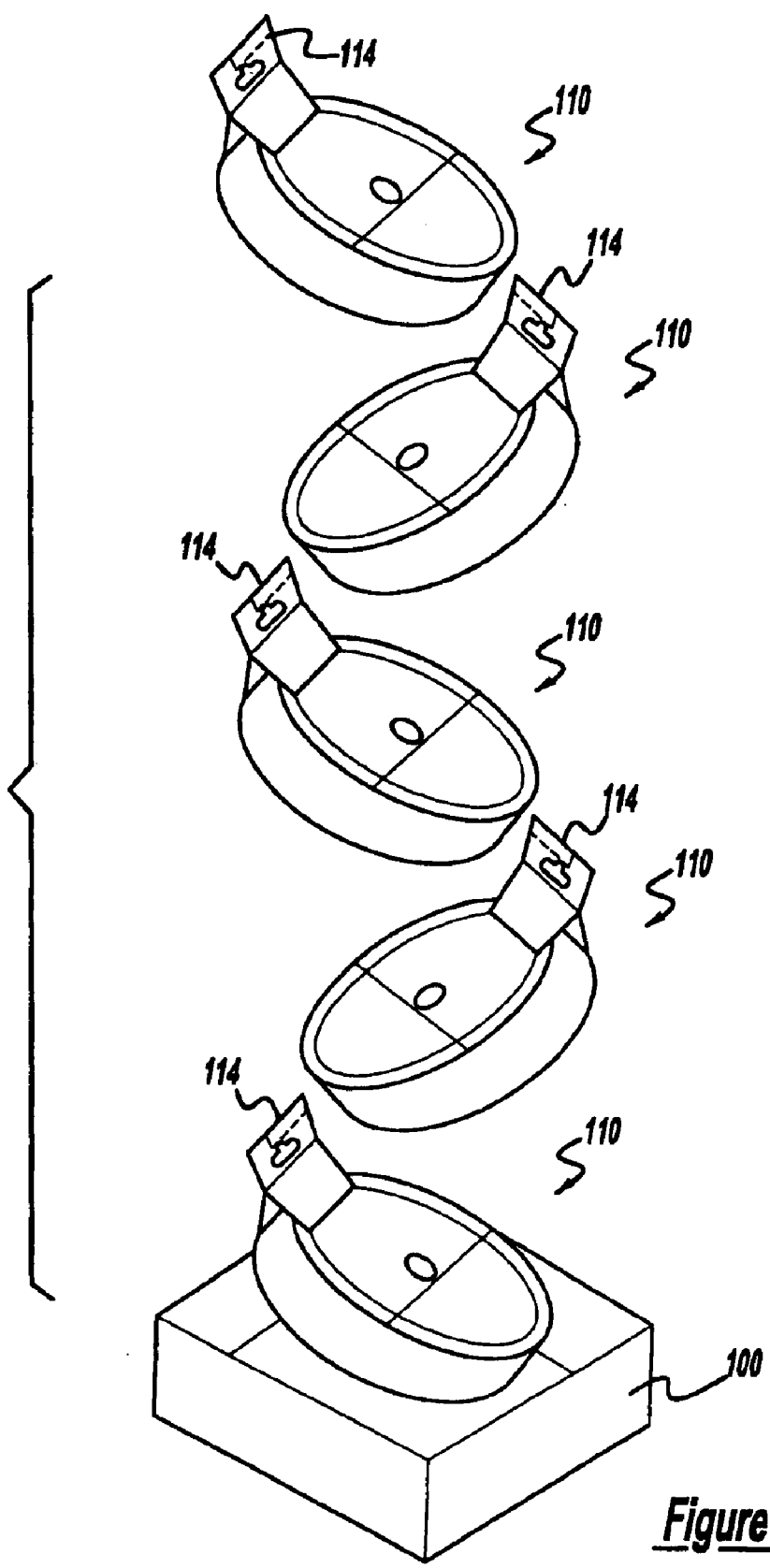
FIG. 19 illustrates the positioning of a plurality of stacks of saw blades of FIG. 18 within a fixed dimension box.

As shown in FIG. 19, tag 114 extends outward from a periphery of the stack 110. Because the tag 114 extends outward from the stack 110, the tag 114 needs to be flexible so that the tag 114 can be folded and a plurality of stacks 110 with covers 32 and tags 114 can fit into fixed dimension box 100 having inner dimensions that are about the diameter of the stack 110 with cover 32. The plurality of stacks 110 having covers 32 and tags 114 are positioned in the box 100 by rotating the stacks 110 so the tag 114 on adjacent stacks 110 alternate. Preferably, the stacks 110 are positioned in the box 100 with the tags 114 oriented toward the corners of the box 100 and the tags 114 on adjacent stacks 110 oriented toward different corners. The flexibility of the tag 114 allows for box 100 to have minimal dimensions and avoids excess packaging (box) waste.

Figure 20:
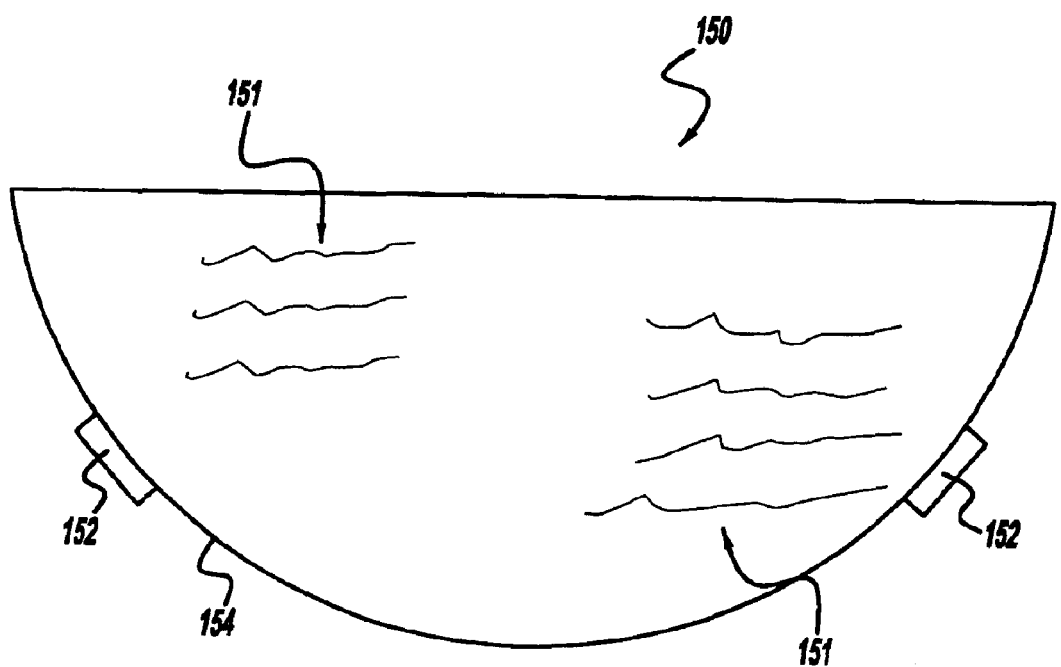
FIG. 20 is a plan view of an insert card of the present invention.

As shown in FIGS. 18–20, an insert card 150 can be provided with cover 32 for display purposes. Insert card 150 contains indicia 151, such as promotional or product information, that can be seen through cover 32. Insert card 150 has tabs 152 along a curved peripheral edge 154 that approximates the peripheral edge 26 of saw blade 20. Insert card 150 is placed adjacent to a saw blade 20 with the respective peripheral edges 154, 26 aligned. Tabs 152 are folded toward saw blade 20 so as to contact peripheral edge 26 The cover 32 can then be heat shrunk around the stack 110 and secure the insert card 150 to the stack 110 and within the cover 32. Optionally, the tabs 152 can be folded over and tucked between adjacent saw blades 20 in the stack 110. Insert card 150 can be made from a variety of materials. For example, insert card 150 is can be cut from SBS board. Preferably, the insert card 150 is 10–12PT SBS board or equivalent with a varnish top coat. Insert card 150 is oriented on the stack 110 so the indicia on the insert card 150 is aligned with indicia 31 on the saw blade 20.

While the composite sheet 142 from which the tags 114 are made has been described and shown as having an intermediate sheet 136 between a pair of adhesive sheets 138 and an opaque sheet 140, it should be understood that other configurations are possible. For example, the adhesive sheets 138 and the opaque sheet 140 can be attached to the same side of the intermediate sheet 136. The use of an opaque sheet 140 can be avoided by printing an opaque ink or similar substance on the intermediate sheet 136 in the location where the opaque sheet 140 would have been attached. The opaque sheet 140 can also be avoided by using an intermediate sheet 136 having a dyed portion or dyed stripes at the locations where the opaque sheet 140 would have been attached.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of stacking saw blades having opposite first and second sides and protective covers comprising the steps of:
    positioning a saw blade adjacent a heat shrinking material so that at least one of a periphery of said saw blade or a first side of said saw blade is in contact with said heat shrinking material;
    heating said heat shrinking material so that said heat shrinking material shrinks to contact and cover teeth on said saw blade thereby forming a protective cover on both said first and second sides of the blade; and
    stacking said saw blade with said protective cover on other saw blades having protective covers with an overall thickness of each saw blade being aligned and a stack of saw blades is formed.

2. The method of claim 1, further comprising the step of:
    preforming said heat shrinking material so that said heat shrinking material has first and second portions with said second portion extending from said first portion at an angle relative to said first portion so that said first and second portions are not co-planar prior to performing the step of positioning said saw blade; and
    wherein the step of positioning said saw blade includes positioning said saw blade adjacent said preformed heat shrinking material so that at least one of said periphery of said saw blade or said first side of said saw blade is in contact with said first portion.

3. The method of claim 2, wherein:
    the step of heating said heat shrinking material includes heating said preformed heat shrinking material so that said second portion folds over said first portion and covers a portion of a second side of said saw blade thereby securing said saw blade between said first and second portions of said heat shrinking material.

4. A method of protecting teeth of a saw blade having opposite first and second sides, the method comprising the steps of:
    positioning a saw blade adjacent a heat shrinking material so that at least one of a periphery of said saw blade or a first side of said saw blade is in contact with said heat shrinking material; and
    heating said heat shrinking material so that said heat shrinking material shrinks to contact and cover teeth of said saw blade thereby forming a protective cover on both said first and second sides of the blade.

5. The method of claim 4, further comprising the step of:
    preforming said heat shrinking material so that said heat shrinking material has first and second portions with said second portion extending from said first portion at an angle relative to said first portion so that said first and second portions are not co-planar prior to performing the step of positioning said saw blade; and
    wherein the step of positioning said saw blade includes positioning said saw blade adjacent said preformed heat shrinking material so that at least one of said periphery of said saw blade or said first side of said saw blade is in contact with said first portion.

6. A method of manufacturing a saw blade having opposite first and second side and a protective cover, the method comprising the steps of:
    preforming a heat shrinking material so that said heat shrinking material has first and second portions with said second portion extending from said first portion at an angle relative to said first portion so that said first and second portions are not co-planar;
    positioning a saw blade adjacent said preformed heat shrinking material so that at least one of a periphery of said saw blade or a first side of said saw blade is in contact with said first portion; and
    heating said preformed heat shrinking material so that said preformed heat shrinking material shrinks to contact and cover teeth on said saw blade thereby forming a protective cover on both said first and second sides of the blade.

7. The method of claim 6, wherein:
    the step of heating said preformed heat shrinking material includes heating said preformed heat shrinking material so that said second portion folds over said first portion and covers a portion of a second side of said saw blade thereby securing said saw blade between said first and second portions of said heat shrinking material.

8. A method of protecting teeth on saw blades in a stack of saw blades having two end blades with each having opposing sides comprising:
    positioning a stack of saw blades adjacent a heat shrinking material so that at least one of a periphery of said stack or a first side of said stack is in contact with said heat shrinking material; and
    heating said heat shrinking material so that said heat shrinking material shrinks to contact and cover teeth on said saw blades of said stack and forms a protective cover on one side of each of said end blades.

9. The method of claim 8, further comprising preforming said heat shrinking material so that said heat shrinking material has first and second portions with said second portion extending from said first portion at an angle relative to said first portion so that said first and second portions are not co-planar, and wherein:

the step of positioning includes positioning said stack adjacent said preformed heat shrinking material so that at least one of said periphery of said stack or said first side of said stack is in contact with said first portion; and the step of heating includes heating said preformed heat shrinking material so that said second portion folds over said first portion and covers a portion of a second side of said stack and secures said saw blades in said stack between said first and second portions of said heat shrinking material.

10. The method of claim 8, wherein the step of positioning said stack includes forming said stack by positioning a first saw blade adjacent said heat shrinking material and stacking additional individual saw blades on said first saw blade until a stack of a predetermined number of saw blades is formed.

11. The method of claim 10, wherein the step of forming said stack includes positioning said first saw blade of said stack and a last saw blade of said stack so that indicia on said first and last saw blades face outward from said stack.

12. The method of claim 8, further comprising attaching a tag having a security device to at least one of said protective cover or outermost saw blades of said stack, said tag spacing said security device from said stack so that said stack does not interfere with operation of said security device.

13. The method of claim 8, further comprising positioning an insert card on said stack so that indicia on said insert card faces outward from said stack, said step of positioning said insert card being performed prior to heating said heat shrinking material, and wherein the step of heating said heat shrinking material secures said insert card to said stack.

14. A method of packaging one or more saw blades having opposite first and second sides, the method comprising:

positioning at least one saw blade adjacent a heat shrinking material so that at least one of a periphery of said at least one saw blade or a first side of said at least one saw blade is in contact with said heat shrinking material;

heating said heat shrinking material so that said heat shrinking material shrinks and covers teeth of said at least one saw blade thereby forming a protective cover on both said first and second sides of the blade; and attaching a tag to at least one of said protective cover or said at least one saw blade.

15. The method of claim 14, wherein said tag has a security device and the step of attaching said tag includes attaching said tag so that said security device is spaced from said at least one saw blade and said at least one saw blade does not interfere with operation of said security device.

16. The method of claim 14, wherein said tag has at least one aperture that allows said stack to be hung from a display device.

17. The method of claim 14, further comprising positioning an insert card on said at least one saw blade so that indicia on said insert card faces outward from said at least one saw blade, said step of positioning said insert card being performed prior to heating said heat shrinking material, and wherein the step of heating said heat shrinking material secures said insert card to said at least one saw blade.

18. The method of claim 17, wherein the step of positioning said insert card includes folding tabs along a periphery of said insert card so that said tabs extend along a periphery of said at least one saw blade.

19. A method of packaging one or more saw blades having opposite first and second sides, the method comprising:

positioning at least one saw blade adjacent a heat shrinking material so that at least one of a periphery of said at least one saw blade or a first side of said at least one saw blade is in contact with said heat shrinking material;

positioning an insert card adjacent said at least one saw blade so that said insert card is in contact with said at least one saw blade and indicia on said insert card faces away from said at least one saw blade; and heating said heat shrinking material so that said heat shrinking material shrinks and covers teeth of said at least one saw blade and a portion of said insert card and forms a protective cover on both said first and second sides of the blade.

20. The method of claim 19, wherein the step of positioning said insert card includes positioning said insert card so that a periphery of said insert card is aligned with said periphery of said at least one saw blade.

21. The method of claim 19, wherein said insert card has at least one tab, and the step of positioning said insert card includes folding said at least one tab so that said at least one tab extends along said periphery of said at least one saw blade.

* * * * *